(12) United States Patent  (10) Patent No.: US 8,451,339 B2
Solomon  (45) Date of Patent: *May 28, 2013

(54) DIGITAL IMAGING SYSTEM FOR CORRECTING IMAGE ABERRATIONS

(76) Inventor: Neal Solomon, Oakland, CA (US)

( * ) Notice: Subject to any disclaimer, the term of this patent is extended or adjusted under 35 U.S.C. 154(b) by 655 days.

This patent is subject to a terminal disclaimer.

(21) Appl. No.: 12/586,221

(22) Filed: Sep. 18, 2009

(65) Prior Publication Data

US 2010/0033604 A1  Feb. 11, 2010

(51) Int. Cl.
*H04N 5/228* (2006.01)
(52) U.S. Cl.
USPC ........... 348/222.1; 348/231.99; 348/224.1; 348/273; 348/208.11; 348/333.08; 348/335; 348/340; 348/241

(58) Field of Classification Search
USPC .......... 348/222.1, 231.99, 224.1, 273, 342, 348/208.11, 333.08, 335, 340, 241
See application file for complete search history.

(56) References Cited

U.S. PATENT DOCUMENTS

2007/0080280 A1* 4/2007 Havens ............... 250/201.1
2007/0236574 A1* 10/2007 Alon et al. ........... 348/207.99

* cited by examiner

*Primary Examiner* — Usman Khan

(57) ABSTRACT

A system is disclosed for the automated correction of optical and digital aberrations in a digital imaging system. The system includes (a) digital filters, (b) hardware modifications and (c) digital system corrections. The system solves numerous problems in still and video photography that are presented in the digital imaging environment.

18 Claims, 19 Drawing Sheets

DIGITAL IMAGING SYSTEM FOR CORRECTING IMAGE ABERRATIONS

CROSS-REFERENCES TO RELATED APPLICATIONS

The present application claims the benefit of priority under 35 U.S.C. section 119 from U.S. patent application Ser. No. 11/825,521 filed on Jul. 11, 2007 and Provisional Patent Application Ser. No. 60/807,065 filed on Jul. 11, 2006, the disclosures of which are hereby incorporated by reference in their entirety for all purposes.

FIELD OF THE INVENTION

The present invention pertains to imaging systems. The invention presents electronic methods to optimize optical processing, the digital capture of light and post-capture image organization of digital data sets. The system may be used in any device that captures, records, replicates, scans, reproduces, accesses, organizes, modifies, edits or stores images digitally. The invention applies to any imaging system that includes interaction between optics, digital image sensors, post-capture integrated circuits and digital storage components. The system includes self-organizing apparatus for optical image collection, electronic organization and optimization of digital data using integrated circuits and software applications. The system applies to consumer and professional still and video photography, including cinematography, to the processing of images with digital sensors, and to copying and scanning technologies. The system also applies to complex grids of multiple video cameras and satellites for surveillance and reconnaissance.

BACKGROUND OF THE INVENTION

The history of photography in the twentieth century is a story of finding solutions for optimizing optical problems. The main challenges have involved improving lens configurations to optimize image quality for film capture. As an example of this, lens aberrations have been reliably corrected by creating aspherical lens elements in wide-angle lenses and by creating apochromatic lens elements in telephoto lenses. The use of lens element coatings has also improved optical quality. Similarly, the evolution of zoom lenses has included improvement in optical quality via the combining of complex optical element configurations; as the optical quality of zoom lenses improved dramatically, their simplicity and utility led them to dominate lens sales. Complex computer-aided design (CAD) software has been used to test a broad range of possible lens configurations so as to optimize the optical performance in terms of clarity and contrast of each lens type, as much as optically possible within economic constraints.

In the last twenty-five years, an additional revolution has occurred with the advent of auto-focus (AF) technology in still photographic and video cameras. Invented by Minolta in the early 1980s, AF technology was a photographic application of technology developed for the U.S. military. The AF system used an infrared light sensor to reflect light onto an object that allowed a camera's lens to focus on the object by employing a motor in the camera. Canon eventually developed improved methods of auto focus by using electronic means (viz., micro ultrasonic motors) to increase speed and accuracy. This AF technology was integrated with automatic exposure (AE) technology which developed complex algorithms in a "program" mode to combine shutter and aperture data to match each lens with particular subject matter, as well as an aperture-priority exposure mode and a shutter-priority exposure mode. Of course, the photographer could use manual focus and manual exposure at any time, but these improvements increased the creative process and the competitive advantages of camera makers and photographers that employed them. Ultimately, the combination of these developments allowed ordinary photographers to achieve high quality standards.

AE was improved by Nikon, particularly with the use of a "3D color matrix" system, which included a library of preprogrammed image types. The combination of the improved AF and AE subsystems allowed a dramatic simplification of photographic imaging because the photographer no longer labored over the time-consuming focus and the exposure variables. Automated film advance, in the form of built in motor drives, increased the working speeds of camera operation as well. Nearly all consumer and professional cameras became automated to some degree by the mid-1990s, including formats beyond the 35 mm film standard.

In the last decade, a new technology of image stabilization (IS) has emerged to help correct the problem of vibrations caused camera shake that lead to image blur. This technology is implemented in lenses by the use of gyros to reorient the light plane to compensate for camera shake; when combined with the earlier automated camera technologies such as AF and AE, IS further improves the photographic experience, particularly for larger lenses.

In addition to these advances in camera automation, technologies improved in the category of artificial flash as well. With microprocessors and sensors employed to measure minute variances, the development of photographic flash systems allowed the photographer to control the lighting in an environment to some degree. Nikon's use of distance information in its flash system advanced the state of the art in flash photography. The combination of AF and AE with automated flash mechanisms provided increased efficiency and simplicity in image capture processes.

The last several years have witnessed a revolution in digital photography. Because of its simplicity, potential quality improvement, immediate feedback and cost savings, digital photography has captured an increasing market share relative to film-based cameras. Kodak holds a number of patents involving the charge coupled device (CCD) for converting and recording light into electronic format. A competing technology for digital capture is complementary metal-oxide semiconductor (CMOS) which, though developed by Fairchild Semiconductor over forty years ago, is predominantly used in photographic cameras by Canon. Although there are trade-offs in the application of CCD and CMOS digital sensors for image capture, they both find wide acceptance in the market.

In order to correct for digital artifacts in image capture mechanisms, anti-aliasing filters are placed in front of digital sensors. Despite this improvement, digital imaging still has some challenges to overcome in competing with the image quality of film.

At the present time, the most recent advances in digital imaging for professional still photography have come from Hasselblad, which offers a Phase One camera back with a 39 MP digital sensor from Kodak. This system uses software that automatically corrects for digital capture limitations to produce a quality image. Their "digital APO correction" (DAC) technology performs an analysis of meta-data to color-correct the digital capture resulting in moiré-free images.

At the limits of current technology, a Canadian company, Dalsa, has produced a 111MP (10,560 by 10,560 pixels) CCD digital sensor that measures four inches square. This technology must be mated with large format-type lenses with large image area, and may be used for satellite surveillance applications and for other astronomical applications.

With both the larger sensor surface area of a medium format camera system and the high-quality fixed focal-length lenses of Zeiss, Schneider and Rodenstock, the quality of even the top optics will be a limiting barrier to advanced digital sensors' ability to perceive maximum resolution. Without new improvements in optical and digital technologies, further progression of photographic camera systems will be limited.

Photographic Problems

Though every major advance in photography has solved an important problem, there are still remaining photographic problems to be solved in order to meet the goals of optimizing optical imaging quality while increasing simplicity and efficiency and lowering cost. Despite the advent and evolution of digital imaging, a number of problems have emerged in the digital realm in addition to earlier problems involving optics. Nevertheless, an opportunity exists to solve some of these problems via digital approaches. These problems are generally categorized as optical or digital.

Optical Problems

In the case of optics, lens aberrations are characterized according to lens type, with wide-angle lens problems differentiated from telephoto lens problems. Some of the problems affecting wide-angle lenses arose from the creation of the single lens reflex (SLR) camera. Before the SLR, the rear element of a lens could be placed in a rangefinder to protrude to a point immediately in front of the film plane in order to correct for aberrations. While the advantages of the mirror mechanism include ability to see exactly what one is photographing, because the mirror of the SLR flips up during exposure, the rear element of the lens must be placed in front of the mirror's plane of movement. This mechanical fact limits lens designs in most 35 mm and medium-format camera systems and particularly affects wide-angle lens configurations.

It is very difficult to control the five aberrations of Seidel—spherical aberration, distortion (barrel distortion and pin cushion distortion), comatic aberration, astigmatism and curvature of field. In wide-angle SLR lenses as they are currently designed, these aberrations are particularly prominent.

For wide-angle lenses, optical vignetting affects peripheral illumination. Though optical vignetting will affect even retrofocus wide-angle lenses in rangefinders, it is particularly prominent in SLR cameras. According to the Cosine law, light fall-off in peripheral areas of an image increases as the angle-of-view increases. While optical vignetting can be reduced by stopping down the lens, the aberrations in rectilinear wide-angle lenses generally exhibit more distortion the wider the lens.

In the case of wide-angle lenses, the depth of field range is much broader, with close focusing causing aberrations without stopping down the aperture. To solve this problem, close-distance focusing is improved by the creation of floating groups of lens elements. The rear lens group elements float to correct close-distance aberrations. With wide-angle lenses that have wide apertures, floating lens elements improve lens aberrations in focusing on distance points also.

Modulation transfer function (MTF) curves represent a quantitative methodology used to assess the resolution and contrast of lens performance at specific apertures. Each lens type has a specific lens element composition, formula and behavior as measured by MTF. In general, MTF measures lens sharpness to 30 lines/mm and contrast to 10 lines/mm.

Because different colors of the visible light spectrum behave uniquely, the goal of lens design is to have all colors accurately hit a film plane or digital sensor plane. The particular challenge for telephoto lenses is that the red and green light colors strike the film plane at different times than blue light colors; thus a compensation must be made in the lens configuration to adjust for chromatic aberrations. Camera lens manufacturers have used extra low dispersion glass and fluorite glass elements in telephoto lenses primarily to adjust the red color light spectra to the film plane. In addition, telephoto lenses use carefully designed lens coatings to limit light diffraction-based aberrations.

Due to their construction, super-telephoto lenses are very large and heavy. While modifying the materials used in the lens barrels could reduce size and weight problems, a technological improvement in telephoto lens design was developed by Canon with the addition of diffractive optical (DO) elements, which behave as a sort of highly-refined fresnel lens magnifier. Though the MTF analyses of wide-angle lenses show dramatic latitude in performance of even high quality SLR lenses, with particular loss in resolution and contrast toward the edges of the image, high quality telephoto lenses show control of aberrations. However, the price of these lenses is prohibitively high.

In the case of zoom lenses, as many as four distinct groups of lens elements correct various optical aberrations. These lens element groups include (a) a focusing group, (b) a magnification variation group, (c) a correction group and (d) an image formation group. Modulating the focal length range of a zoom lens enables the lens to perform within the scope of operation, yet the zoom lens architecture has limits. In particular, the zoom lens configuration sacrifices resolution and wide potential aperture. Generally, the degree of resolution and contrast at the smaller angle of view is traded away in favor of competence at a wider angle of view, or vice-versa. This explains why MTF analyses of zoom lenses generally show a dramatic lowering in resolution and contrast relative to excellent fixed focal length lenses.

Digital Problems

Digital photography has built on the edifice of film camera systems. For instance, the size of the sensor is generally limited to the size of the optical circumference of a lens system. In the case of 35 mm lenses that are designed for a specific angle of view, the largest that a digital sensor can in a 35 mm lens system could be, is 24 mm by 36 mm, with a corresponding maximum image circle of 43 mm. In the case of medium format lenses, the largest digital sensors would duplicate the corresponding film plane size, whether 6×4.5 cm, 6×6 cm, 6×7 cm, 6×8 cm, 6×9 cm, 6×12 cm or 6×17 cm (which results in an effective image circle as large as 7 inches).

Digital sensors that are smaller than the limits of a corresponding lens system have been introduced. For example, Nikon digital sensors are smaller than 24 mm×36 mm, or advanced photo system (APS) size. Efficient stacking of pixels allows a smaller sensor to eventually match the performance of a corresponding film system, while using the smaller circumference of the same lenses. Since the outside edges of the lens typically degrade resolution and contrast, this model using the smaller digital sensor can have an advantage of using primarily the centralized "sweet spot" of the image area. However, this smaller sensor size sacrifices the peripheral effects of a wide-angle lens, so a 14 mm becomes a 21 mm in a 1.5× conversion-sized sensor in a 35 mm lens system. On the other hand, with telephoto lenses, the angle of view is limited to the center 65% of the image. This gives the appearance of upconverting a telephoto lens by 1.5× and thus provides an impression of increased magnification; a 400 mm f/2.8 lens appears as a 600 mm f/2.8 lens on a camera with a cropped digital sensor. Ultra-wide-angle lenses have been introduced with smaller image areas than 35 mm to compensate for smaller sensor size.

Though invented over thirty years ago by Dr. Bayer, the charge coupled device (CCD) that is used in many digital cameras generally emulates the behavior of film. Specifically, since most photographic film has three layers of green, red and blue, with green representing fifty percent of the emulsion and red and blue twenty-five percent each, the CCD architecture also configured pixels to capture fifty percent of the green photonic visible light spectrum and twenty-five percent each for pixels recording red and blue light. Human eyes see more green than red and blue, so both film and digital sensors seek to emulate the way that we see. Each light color is captured by a different pixel in the CCD, just as there are three emulsion layers of film. In recent years, Foveon has developed a digital sensor for image capture that further seeks to emulate film by structuring the pixels into three layers, again with fifty percent capturing green light and twenty-five percent each capturing red and blue light.

Unfortunately, unwanted artifacts are also captured by the digital image capture process. These include banding and moiré effects that present false patterns and colors. Moiré patterns are created because the dot pattern of a sensor will intermittently overlap with the pattern of a subject to create a third pattern; these effects are optically-generated digital distortions that represent the effect of light hitting a pixel without correction. In order to compensate for these effects, digital sensors have employed low pass filters consisting of liquid crystal structures; however, these filters tend to have the effect of softening image resolution. Additionally, RGB or CMYG color filters are placed in front of digital sensors to ensure the accurate capture of colors.

CMOS digital sensors present an alternative to CCDs. By employing alternating positive and negative transistor networks, the CMOS sensors use less power. While they do not have the low noise ratio of the CCD, they do have greater light exposure latitude, in both range of ISO and dynamic range of detail in highlight and shadow. More importantly, CMOS sensors contain the circuitry, including analog to digital converter (ADC) and digital to analog converter (DAC), for post-processing digital images on the chip itself and enabling increased micro-miniaturization of the digital imaging process. An increase in the bit rate of the CMOS chip up to 32-bit makes possible a much richer color palate and level of detail than with earlier generation CCDs.

CMOS sensors can be full-frame, matching the lens specifications for the camera systems for which they are designed. A relatively bigger sensor has a wider depth of field capability, so the background can appear as a blur to set apart the main subject. Given these capabilities, one problem that emerges is that a digital sensor's enhanced capabilities to capture details may exceed the maximum optical resolution capabilities of many lenses. Nevertheless, CMOS sensors still require an anti-aliasing filter to be used in front of the sensor, which marginally degrades resolution.

Over the years, cameras have gotten smaller. While in the 19$^{th}$ century cameras were 11×14 or 8×10, literally capturing images on large emulsion plates, cameras of today are smaller and more automated. Yet the larger the film size, the bigger the enlargement potential and the increase in relative detail in the overall image. Similarly in digital photography, the larger the sensor, the more detail available and the bigger the output print can be enlarged. Because of this correspondence of digital sensor to film, the evolution of digital photography has been restricted to respective film camera systems, with 35 mm and medium format systems dominating the field because well-developed lens systems have already been organized for these camera formats. The potential exists, however, to develop 35 mm camera system digital sensors that rival film-based medium format or large format camera system quality or to surpass the limits of 35 mm camera systems with medium format camera system digital sensors. The relative size, cost and automation advantages of 35 mm camera systems generally show that these systems not only are competitive, but that these markets are increasingly accelerated relative to larger format systems. For example, the development of large aperture lenses, super-telephotos, rapid auto-focus, refined automated exposure and image stabilization systems in 35 mm systems has solved various problems that have emerged in the last century and has improved image quality and camera system efficiency.

However, in the digital imaging realm additional problems have emerged, including the need to improve color (hue and saturation) quality, exposure highlight range, contrast range and other tonal adjustments. In addition, digital image capture brings its own set of aberrations, including moiré and banding effects and noise and ISO range limits. Additional aberrations are linked to the unique design of each type of digital sensor, with trade-offs presented between types of CCDs or CMOS chips. Moreover, there are still optical problems in the digital realm, namely, a range of optical aberrations created particularly by wide-angle and zoom lenses as well as the limits of very large, costly and heavy super-telephoto lenses.

In order to transcend the optical and digital limits of present camera systems, software systems have been developed that deal with the problems in post-production. While the most notable of these post-production digital editing software programs is Adobe Photoshop, each camera manufacturer has its own proprietary program. In the main, these post-production software programs are limited to color correction and sharpening/softening of images. Additionally, some of these software programs are able to emulate specific artificial filter techniques to produce creative modifications of an original image. Nevertheless, manipulating unfiltered RAW image files in post-production processes is time-consuming and expensive and requires considerable skill.

One unintended effect of using digital sensors to capture images in digital photography is that dust accumulates on the sensor surface and thereby obstructs a clear optical image. The vacuum behavior of increasingly ubiquitous zoom lenses moves dust in lenses that are not internally sealed and the existence of dust is a prevalent feature of digital photography. Dust on the sensor is a non-trivial problem that requires tedious post-production correction for each image. The existence of dust on a digital sensor is an inconvenient impediment to achievement of optical imaging quality.

What is needed to correct these various optical and digital aberrations and unfiltered image files is in-camera modification capability for each specific image problem. The present invention describes a digital imaging system to optimize optical results.

APPLICATIONS OF THE PRESENT INVENTION

The present invention has several practical applications. The digital imaging system applies to consumer and professional still and video camera technologies, to cellular telephones and to personal digital assistants (PDAs). Since video technologies are evolving into digital formats, including HDTV and its successors, the present invention would be applicable to these technologies. The present invention also applies to networks of remote camera sensors for surveillance. The system also applies to native digital cinematography and telecine conversion from analogue to digital media. The system may be applied to image scanning and image copying technologies. Finally, the present system may be applied to any optical digital capture, processing and storage sub-system technologies, including groups of sensors or satellites.

ADVANTAGES OF THE PRESENT INVENTION

There are several important advantages of the present invention. The present system dramatically improves image quality. This digital imaging system eliminates, or minimizes, post-production processes. In addition, the system presents substantial cost savings as well as time savings relative to existing digital imaging systems because of the automation of integrated in-camera optical and digital corrections of aberrations.

With the present system, in-camera digital filters will largely replace optical filters. With less distortion, cost and weight/size than current optical filters and with far more control and quality results, the present system demonstrates that in-camera digital filtration out-performs better than external filters. The in-camera filter system is also an improvement over post-production digital filter systems which require substantial time, cost and skill to implement.

By using the present invention, users will be able to use lens apertures that are wider open, because lens aberrations will be corrected. In turn, this increased latitude will allow more efficient (2+ stops) use of available light and will allow slower lenses to achieve quality images that have traditionally been in the domain of expensive fast lenses. The process of photography will be made generally more efficient.

The present system allows camera manufacturers to design different, predominantly smaller, lenses. Moreover, with providing a system for digital corrections, camera lenses may use less expensive optics and still obtain good results. This process will, in turn, accelerate the adoption of low-cost digital photographic systems and, in the aggregate, increase the overall size of the digital photographic market. Similarly, there will be an increase in the effectiveness of zoom lenses, which are already becoming popular. With the present system, 35 mm optics may obtain the quality typically recognized by 4×5 film camera systems. The present system will thus facilitate photographic digital imaging to supplant the film era.

Its application to digital scanning and copying will allow the present system to become ubiquitous as a system to improve imaging.

Because the system presents an integration of several critical subsystems that are centered on digital imaging processes, the system has applications to video photography, satellite systems and surveillance systems. The dynamics of the operation of the subsystems of the present digital imaging system reveal the refinement, efficiency and optimization of the digital photographic paradigm.

Importantly, since the present system uses apparatus and methods that are implemented with software processes, in-camera software can be constantly upgraded and remotely downloaded, while image files can be automatically uploaded, organized and published.

If the goal of the evolution of photographic technology is to increase the number and quality of excellent images, the present system will revolutionize photography.

Solutions to Digital Imaging Problems that the Present System Presents

The present system provides in-camera digital corrections to both optical and digital aberrations. In the case of optical aberrations, distinct lens-specific imperfections are caused by wide-angle, telephoto and zoom lens types. In the case of digital aberrations, specific digital artifacts, such as aliasing and dust, must be corrected.

The present invention also designs specific improvements to digital sensor design. These hardware architecture modifications allow digital imaging to maximize both optical resolution and image exposure range.

Post-capture in-camera filtration is only part of the solution. There is also a need to modify the digital sensor, whether CCD or CMOS, with specific filtration in some cases, including a low pass anti-aliasing filter and a polarizing filter. This post-optic pre-sensor filtration works with post-sensor in-camera filtration processes.

In the context of specific complex processes, such as in zoom lens modifications of focal length and in full-motion video processing, additional corrections are performed using the digital imaging system which continuously optimizes performance.

Finally, the present system reveals approaches to improve network coordination and wireless external storage and publication capabilities for digital imaging systems.

BRIEF SUMMARY OF THE INVENTION

The present invention is divided into several main sub-systems: (1) digital filters to correct optical and digital aberrations; (2) digital sensor improvements and nano-grids; (3) digital system improvements that link multiple digital corrections; (4) dynamic digital imaging system improvements that apply to zoom lenses and video imaging; and (5) digital image network improvements. There are several distinct improvements for each category of sub-system listed.

Figure 1:
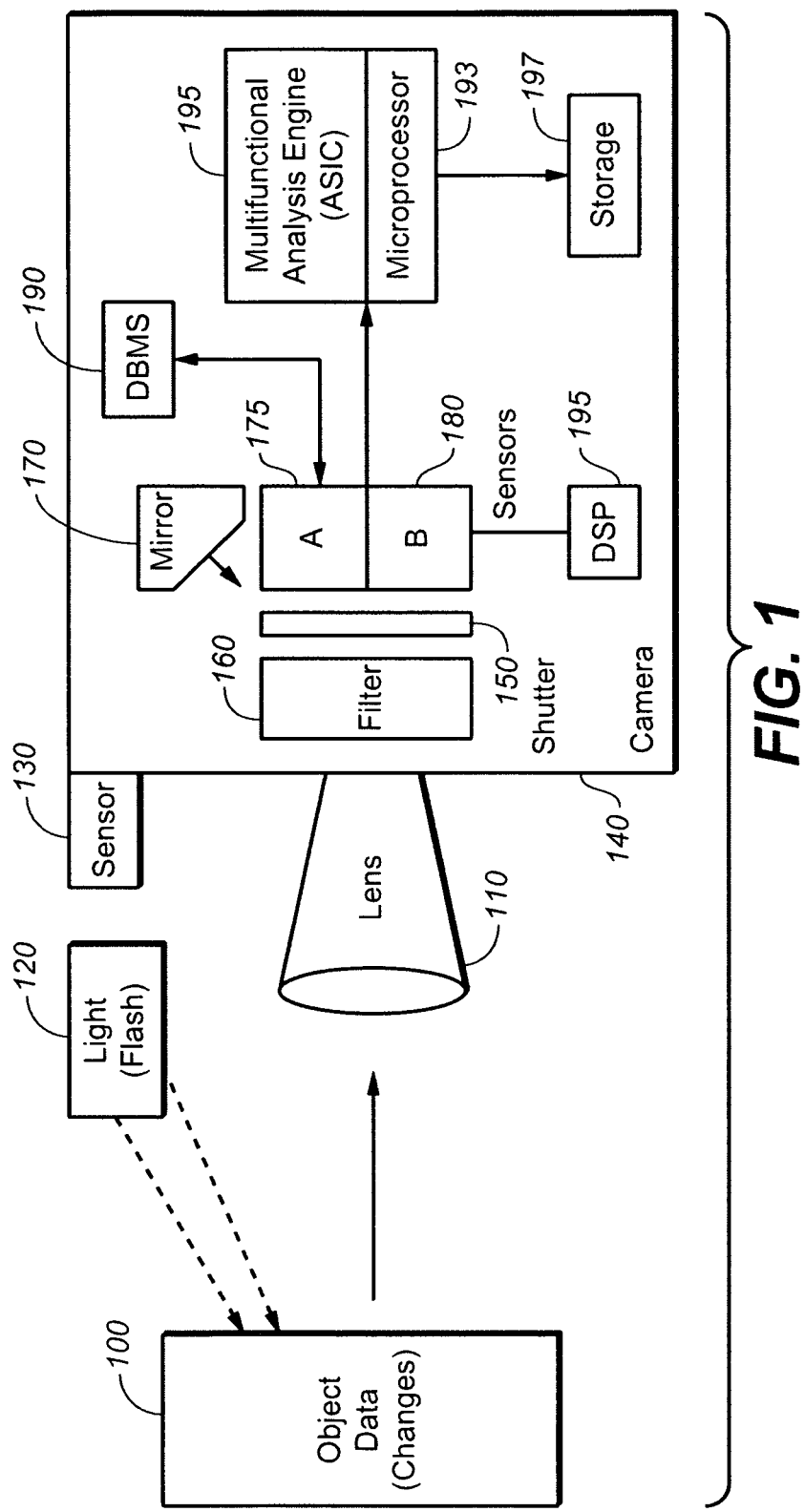
FIG. 1 is a schematic drawing of a digital imaging system.

DETAILED DESCRIPTION OF THE INVENTION (I) Digital Filters to Correct Optical and Digital Aberrations
(1) Lens-Specific Digital Correction of Fixed Focal-Length Lens for Specific Optical Aberrations in Camera.

Each lens has some sort of aberrations because of the trade-offs involved in producing lenses of usable size and practical commercial cost. The challenge of building lenses for SLR camera systems lies in accounting for particular restrictions and compromises, particularly for wide-angle and zoom lenses. In the case of wide-angle fixed focal length lenses, several main kinds of aberrations occur, including spherical aberration, distortion (pin cushion distortion and barrel distortion), astigmatism, curvature of field (manifesting as the reduced corner exposure of vignetting) and comatic aberration (a distortion evident with long exposures). The extremes of each of these aberrations have to be corrected in post-production.

In the case of vignetting, a type of aberration in which the corners of an image are exposed a stop less than the image's center area, software can digitally emulate a center-neutral density filter to compensate for the light fall-off on the edges. This operation identifies the degree of light fall-off for each specific lens and adjusts the brighter areas in the center of the lens by appropriate exposure compensation. A consequence of this digital equivalent of the traditional optical solution to vignetting is that the image will require exposure metering of the subject at a level consistent with the outside edges of the image rather than the typical inner section. In the present system, the camera will use pre-set calculations compensating (generally one stop) for the specific gradations of the curvature of the field for each lens, with an increasing compensation correlated to an increased angle of view. Similarly, barrel distortion and pin-cushion distortion, which also manifest in image corners, are corrected using processes of employing pre-set calculations, to compensate for optical distortion, particularly in wide-angle and zoom lenses.

In addition to integrating into the camera the traditional process of image correction for exposure gradations of vignetting, the present invention offers two further embodiments. First, instead of darkening the center to match the darker corners, the in-camera digital compensation system will lighten the corners to match the exposure of the center of the image. In the second embodiment, the in-camera digital compensation system will both lighten the corners somewhat and darken the center of the image somewhat, to produce a more pleasing and realistic effect. The in-camera digital corrections of the vignetting problem dramatically improve the traditional optical solution of a center-weighted neutral density filter, which typically degrades image quality as it evenly illuminates the full image.

Since each lens has specific aberrations, depending on manufacturer and even differences in the specimens themselves, the camera software system will have preprogrammed general corrections for each specific lens type. For instance, while a 20 mm f2.8 lens varies among manufacturers, the general optical aberrations will be similar. An effective software solution is one which brings the optical image quality to a level consistent with a benchmark as measured by low MTF curves for each lens in its class in terms of both resolution and contrast throughout the image. To exemplify this benchmark, retrofocus rangefinder lens performance results of wide-angle lenses, which lack a shutter mechanism to design around, can be used for comparison. To accommodate the mirror in the SLR design type, the rear nodal point in SLR lenses are shifted forward, creating distortion. In contrast, the present system suggests applying a digital solution to compensate for this problem.

In a general sense, this process of correction is similar to correcting an ocular astigmatism with reading glasses. However, rather than using an optical solution to an ocular problem, the present system reveals a digital solution to an optical problem.

In the process, the camera identifies a specific lens and refers to a database that matches the lens type with the specific aberrations. The aberrations are consistent throughout all images for each formula of a specific prime lens type and are thus corrected by adjusting for each specific aberration category. Generally, the larger the angle of view of a lens, the greater the distortion and the greater the need for in-camera digital corrections.

In addition to the kinds of distortions created in wide-angle lenses, other types of distortion occur primarily in large aperture telephoto lenses, most notably chromatic aberrations that require apochromatic corrections. Rather than employing large, heavy and expensive extra dispersion glass, such as fluorite elements, the present system allows each lens type to be digitally corrected for these types of aberrations. The in-camera digital process works by identifying a specific lens and comparing the lens pattern to an internal database. Mathematical calculations compensate for the shift in red and green light that apochromatic corrections require for very low MTF curves registering high standards of resolution and contrast by emulating the optical benefits of extra low dispersion glass elements.

Since lenses of the same focal length but with different maximum apertures represent completely different lens designs, modifications of their aberrations will vary relative to each specific lens type. For example, a 24 mm f/2.8 lens will have a different optical formula than a 24 mm f1.4 lens in a 35 mm camera system. Similarly, a 28 mm f/2.8 will differ from both a 28 mm f/2 lens and a 28 mm f1.4 lens and will thus each require different adjustments for vignetting, spherical aberration, pin cushion distortion, barrel distortion and coma. In other words, each lens with a unique optical formula will have specific aberrations, the corrections for which will be accessible in a database.

Another type of optical aberration that affects lenses involves flare, which is a sort of specific reflection of light sources. While improvements in lens coatings have been used to correct for flare, high refractive glass also eliminates flare. The present system uses digital processes to emulate these flare reduction functions on lenses even at maximum apertures.

In addition to the lens-specific types of corrections that are supplied by in-camera software, a function that optimizes contrast provided by limited reflected light is required. In general, lens hoods reduce reflected light. However, in the absence of a lens hood, scattered light will adversely affect contrast in all lenses. Thus, a general digital solution will optimize contrast from reflected light by emulating the effects of a lens hood.

Because the pixels on a digital sensor behave as neutral intermediaries to record light, the aberrations on specific fixed focal length lenses will be prominent. It is therefore necessary to filter out various optical impurities. In all cases, the digital in-camera software program emulates specific filters to effectively correct specific optical aberrations.

By digitally adjusting for optical distortions, the present system advances the state of the art for fixed focal length lens optics, beyond any opportunities available in film cameras. The following chart illustrates a list of optical distortions that are corrected by in-camera digital solutions.

|  | Fixed Focal Length Lens Type | | Zoom Lens Type | | |
| --- | --- | --- | --- | --- | --- |
| Specific Aberrations | Wide-angle | Telephoto | Wide-angle | Wide-to-Tele | Telephoto |
| Spherical | X |  | X | X |  |
| Comatic | X | X | X | X | X |
| Astigmatism | X |  | X |  |  |
| Distortion (Pin Cushion and Barrel Distortion | X |  | X |  |  |
| Curvature of Field | X |  | X |  |  |
| Chromatic |  | X |  | X | X |
| Flare | X | X | X | X | X |
| Scattered light (Unpolarized) | X | X | X | X | X |
| Color Accuracy | X | X | X | X | X |
| No Lens Coatings | X | X | X | X | X |

(2) Multivariate Digital Correction Using Matrix Filter System in Camera

Since typically several distinct aberrations exist in a lens, it is necessary to correct each of the aberrations. For this multidimensional problem there is a multivariate digital in-camera software correction solution. The problem of correcting multiple aberrations presents the additional challenge of requiring acceleration to complete multiple tasks rapidly. In most cases, the hardware employed in a camera's chip set will include an application specific integrated circuit (ASIC) which processes a particular program rapidly. It is appropriate to facilitate the combination of corrections to multiple simultaneous aberrations with an ASIC or multiple ASICs.

There is a need to optimize both resolution and contrast across the image area for accurate light reproduction. One way to do this is to stop down the lens to an optimum aperture of about f/8. However, this solution sacrifices the advantages of a fast lens design and capability, namely, limited depth of field and bokeh (smooth out-of-focus area). Though resolution is typically improved by stopping down a lens, digital sensors are generally still restricted in their latitude of contrast. Therefore, regarding both resolution and contrast, it is necessary to provide multiple adjustments of the native image with in-camera digital corrections.

While it is possible to produce mathematical algorithms for automatic correction of optical aberrations, it is also useful to have manually adjustable variables. Therefore, the present system includes a function whereby one may omit a specific correction in an image by using a lens with multiple aberrations in order to induce a particular creative effect. This factor may involve a lack of exposure compensation, a lack of correction for spherical aberration or an improperly or partially corrected apochromatic modification.

In one example of the use of multiple corrections, simultaneous application of multiple digital filters concurrently corrects multiple aberrations. In effect, this is like adding layers of different eye glasses to repair multiple types of astigmatisms for each specific ocular condition. The dynamics of correcting multiple simultaneous aberrations may be complex, but since the number and type of aberrations are constrained to a specific lens type, a centralized database may be accessed with specific corrections for each respective aberration. For example, lenses with multiple complex aberrations, such as in very wide-angle lenses, will require multiple corrections. These combinations of corrections become complex as focal length modes change in zoom lenses and as aperture changes.

The following is a list of filter types that provide digital methods of correcting image problems or creating specific effects. The list is not intended to be comprehensive or systematic.

| Filter Type in Digital App. | Most Common Uses | Other Filter Types |
| --- | --- | --- |
| UV (and Sky) | General Use | Polarizer |
| Color-enhancing (and warming) | 17 mm-200 mm (in 35 mm) | Close-up |
| Contrast | 17 mm-200 mm (in 35 mm) | Special effects filters |
| Black and White (Red, Orange, Yellow, Green) | 17 mm-200 mm (in 35 mm) |  |
| Infrared | 17 mm-200 mm (in 35 mm) |  |
| Color Graduated (Neutral Density) | 17 mm-200 mm (in 35 mm) |  |
| Diffusion (Soft, mist/fog, star, streak) | 24 mm-135 mm (in 35 mm) |  |
| Combinations (Neutral density and enhancing, Polarizer and UV) | 17 mm-200 mm (in 35 mm) |  |

In the past, these optical filtration processes were added after the production process via editing software such as Photoshop. However, in the present system, these combinations of processes are performed in-camera by user-adjusted settings. In the case of artificial color changes to an image, digital processes emulate specific optical filters by adding a specific color or a combination of colors. On the other hand, in the case of diffusion filtration, the in-camera digital process creates an emulation of optical filters. The classic example of this diffusion approach is the soft filter, which is used for portraiture. In this case, various user-adjustable settings in the camera digitally manipulate soft filtration.

(3) Depth-of-Field Optimization Using Digital Correction in Camera

In addition to correcting optically-generated aberrations with in-camera digital processes, the present system allows in-camera depth-of-field (DOF) optimization by affecting the aperture of the lens that is used.

DOF in an image is dependent on the aperture setting in a lens, in which a moderate DOF range—allowing a subject to be isolated in an image—can be manipulated, that is, extended or narrowed, by the camera's digital processing capability. In the film paradigm, one obtains a specific aperture, and thus the corresponding DOF, that is preset by the photographer. However, in the digital paradigm, by contrast, one can narrow an image's surplus DOF range in-camera by manipulating the aperture. This process can only be done in the camera, because once the digital file is sent to post-production editing, the aperture and DOF is already set and incapable of being changed. The aperture is narrowed in camera by isolating the subject and shifting the field of view (forward from the rear range of DOF and backward from the front range of the DOF). Distance information is used to recalculate an optimal DOF. In another embodiment, the camera provides feedback from an internal computational analysis that results in a specification of less DOF and takes another image (or images) with a larger aperture to accomplish reduced DOF at a specific focus point.

The camera will effectively identify a type of subject and provide an optimal aperture for this subject. For instance, for a portrait, the camera will select a shallow DOF around the subject. In the case of a distant landscape, the camera will focus on a distance at infinity and provide a nominal aperture to correspond to shutter speed that will fit the available light as matched to a specific lens. A near landscape photographed with a wide-angle lens will, on the other hand, have a near focus and a maximum DOF; specific subjects will be highlighted with ample DOF. The camera will also have the capability to bracket exposures in several successive images based on DOF variations.

The DOF manipulation thus depends on a combination of data sets including the particular lens used (wide-angle lenses have greater DOF at moderate distances than telephoto lenses), the distance information and the unique combinations of aperture and shutter speed. DOF will narrow with less distance, with use of a telephoto lens and a fast aperture; contrarily, DOF will expand with a further distance, with use of a wide-angle lens and a slower aperture.

In another embodiment of this process, test images are taken and analyzed, then later images taken with new settings optimize DOF for each image type.

(4) Exposure Optimization Using Digital Correction in Camera

One phenomenon that film currently records better than digital photo technology is exposure latitude. Film is capable of greater exposure latitude than either CCD or CMOS digital sensors, though each digital sensor type has strengths and weaknesses. For the crucial detail recorded in a scene, film provides far more depth of tonal range. Yet some of this problem—caused by the limits of digital sensors themselves and the way that photons are recorded by electrically charged pixels—can be digitally corrected and optimized in-camera.

The problem derives equally from the method of measuring exposure as well as the method of image capture by a digital sensor. In general, since there is less exposure latitude in digital sensors, as compared to film, the maximum scope is two or three stops in the image tonal range. Consequently, the camera must meter the image within constraints of the tonal range of the digital sensor, with the sacrifice of either shadow detail or highlight detail. In an image with broad exposure range, then, the image will generally be either too light or too dark because metering for one area sacrifices the other tonal category.

One way to solve this problem is to manipulate the lens aperture, because increased aperture within an optimal limit generally increases detail. An optimal aperture of f/8 provides more detail and clarity than at f/2 or at f/32. The in-camera processor may thus seek out more detail in the image by manipulating the aperture to the optimal range of f/5.6 to f/11, depending on the type of subject and the availability of light. With more detail in the original image, it is possible to interpolate the digital data in the image file by increasing both shadow and highlight detail and to gain an additional stop or two of tonal range.

In another embodiment, the tonal range of an image data set is enhanced in-camera by using meta-data to sample the range of shadow and highlight detail. The data sets are interpolated to add requested shadow detail and/or highlight detail. Obviously, some subjects require more or less shadow or highlight (or both), which the camera can correspondingly adjust. These tonal range corrections are user-adjustable.

In an additional embodiment of in-camera tonal range corrections, exposure data are bracketed by manipulating the aperture and shutter speed to lower or raise the overall exposure in one-third to one-half stop increments. This bracketing method may be correspondingly limited to a specific image type. For instance, in a portrait, the extraneous background, which ought to be out of focus, is not emphasized in the exposure data, while the main subject is carefully nuanced for balancing an optimum of both highlight and shadow, or for an exclusive emphasis on either highlight or shadow.

The overall problem of limited tonal range in digital photography stems from mismatched exposure-metering mechanisms of digital sensors with substantially restricted tonal range capabilities. One interesting example of this problem occurs in scenes with two or more stops of difference, such as a landscape with sky on top and earth on bottom. A filtration process will operate on the key parts of such an image, as described above regarding the vignetting phenomenon; the overexposed top half of the scene will be gradually underexposed while the lower half of the scene will be gradually overexposed. This scene-specific adjustment of exposure greatly increases the tonal range of digital images and is made possible via analysis of the scene and comparison to a database of typical scenes categorized by the in-camera digital processor which effects correction using the methods described herein. In this example, the corrective process emulates the use of neutral-density optical filters.

(5) Special Effects Digital Filtration of Specific Objects

Though there are several main categories of special effects optical filters, including color enhancing, infrared and diffusion, the use of diffusion filters appears to elicit the most dramatic effect. Diffusion filters are categorized as soft effect, mist/fog, black mist, gold diffusion, and star and streak, with various degrees of diffusion producing lesser or greater distortions. In effect, rather than removing optically-generated distortions, we are deliberately creating photographically desirable distortions. It is possible to reproduce these special effects by using the digital post-capture production processes in the camera. In this case, the camera digitally emulates the special effect by applying user-adjustable filter settings.

Portraits have traditionally used some sort of soft effect filtration approach which is producible in the camera using the methods described here. After the image is captured, the camera analyzes the image's meta-data and applies a correction by interpolating the data with specific filter emulation. In the past, specific camera lenses, such as the 135 mm soft effects (also called "defocus control") lenses performed this function optically with an included adjustable lens element. This defocus control lens type will focus on the main subject and a lens element setting of the telephoto lens to produce a soft filter effect. In addition, because this lens type uses a nine blade aperture, the background that is out of focus has a pleasing bokeh in which the gradations of tone are evenly smooth. Nevertheless, a sophisticated digital camera is able to produce the same results with more information provided by a normal telephoto lens, using the method of emulating special effects in-camera.

Another novel special effect that is a further embodiment of the system is the ability of the in-camera digital corrective system to use complex data sets contained and analyzed in an image to create a three dimensional (3-D) representation of the image. The camera creates a 3-D image by arranging the DOF in a way that optimizes the aperture by using distance information and autofocus data to isolate a subject. By removing the foreground and background of the image as a center of subject focus, the DOF will emphasize the subject only as 3-D. The key to this effect is the application of specific exposure data as indicated above, because it is in the increased extension of the range of highlight and shadow that the subject in the image will attain a 3-D quality in contrast to its out of focus foreground and background.

An additional embodiment of the present system would extend the still photography in-camera special effects to video with full-motion ranges of filtration actions.

Finally, it is possible to combine different user-programmable special effects in-camera by adding the various types of diffusion methods for a specific image.

(6) Selective in-Camera Filtration of Specific Objects

The combination of sophisticated auto-focus technologies and in-camera auto-exposure systems provides the opportunity to isolate a subject by focusing on the subject and narrowing the DOF range by manipulating the aperture. In a further extension of the subject-isolating capabilities of these technologies, it is possible to digitally filter out specific objects in a scene in-camera while focusing on other selected objects that are in a specific range of DOF. In other words, one may apply filtration to correct aspects of a single object or only the background of a scene to the exclusion of an isolated object, rather than correcting a whole scene. Selective filtering of specific objects in an image by in-camera digital processing affords greater creative flexibility.

Because the camera uses distance information to isolate a specific object by focusing on the object within a range of DOF, it is possible to isolate a particular object for the purposes of applying a specific filtration preference, such as manipulating the color, correcting the optical aberration (say, if the object is in a corner of the image of a wide-angle lens), providing a special effect (such as a soft effect only on a specific object rather than the scene as a whole) or using some combination of these corrections. Once the camera isolates the selected object (using auto-focus mechanisms and distance information), the user selects programmable correction features to perform a corrective function only on the specific object (or only on the parts of the scene that are exclusive of the object). In a further embodiment, contrastively, once the object is isolated, only the background may be selectively manipulated with filtration, achieving pleasing effects. This in-camera corrective feature provides a powerful tool to rapidly manipulate an image without using post-production editing software tools.

These object-specific in-camera selective filtration capabilities are particularly dramatic with fast-moving action photography in which split-second timing produces the preferred complex effects. Selectively identifying a particular object for intensive combinations of filtration is a highlight of the present system.

(7) Digital Correction in-Camera of Intermittent Aberrations Caused by Dust on Digital Sensor Dust on a digital sensor is a major concern for photographers. The use of zoom lenses compounds this condition, because as the zoom lens changes focal-length positions, air is transmitted, which results in the proliferation and diffusion of sensor dust. Unless photography is isolated to a clean room, the problem of dust on a digital sensor will remain prevalent. The present system provides a method to correct for this phenomenon.

In the case of dust on a sensor, a specific consistent pattern emerges on each image captured by the digital sensor. Consequently, information from various images is analyzed, and the pixels affected by dust are identified. Information from the consistent fixed pixel positions that are affected by the dust are then isolated. The specific positions with the dust are then analyzed by comparing the immediate areas surrounding the dust that are not affected by it. These unaffected areas are analyzed, and the affected areas are interpolated to provide a continuous tone. In effect, the images identify the locations with dust by using caching technology. The continuity of the location of the dust between multiple images provides information to the in-camera image processor to detect the specific pixel locations. The camera will then apply a corrective process to the isolated dust locations with adjoining exposures by interpolating these distinct locations for each specific image configuration.

In another embodiment of the present system, "hot" (too bright) or "dead" (too dark) pixels are interpolated out of the scene using the method described above. Unlike hot or dead pixels, dust is a similar but temporary version of the same problem of an artifact that requires in-camera modification. In effect, a map is built to discover, isolate and interpolate bad pixels, which are a permanent problem revealing a key limit in digital sensor technology. Separate maps are constructed for permanent pixel dysfunctions and temporary pixel aberrations (viz., dust). In both cases, the camera works from these maps to correct the aberrations on a pixel-level.

In a further embodiment of the present system, Monte Carlo analysis is applied to the problem of identifying the location of dust on specific pixels (or partial pixels) by randomly creating an initial map from information of at least two contaminated images.

In still another embodiment of the present system, the process of modifying pixel aberrations (either permanent or temporary) uses a sequence of operation which begins by correcting the major aberrations first, then repairing the minor aberrations, thereby maximizing efficiency. This is done by starting the corrective process in a specific location of the image and moving to other positions in an efficient pattern.

(8) Sequence of Corrections for Multiple (Optical and Digital) Types of Aberrations in Camera Since it is evident that multiple digital filtration approaches may be used for specific types of problems or aberrations or to achieve specific effects, it is clear that a combination of the techniques may be employed simultaneously on specific images. The present invention allows the various optical and digital corrections to be performed in camera in a sequence of actions. The user selects the various combinations of functions required to be performed, inspects the effects, and chooses the most effective combination of effects. Thus the invention offers a combinatorial optimization of the totality of corrective filtration approaches.

After the images have been taken, it is possible to inspect them in the camera using the camera's image read-out. This makes it possible to create new files, or to adapt a RAW file, in real time, by manipulating the various corrections in sequence. This post-image-capture in-camera editing process allows multiple corrections to be applied to a range of optical and digital aberrations by combining various specific corrective techniques.

In some cases, the user can pre-set specific corrections. For instance, to correct for optical aberrations, a user may leave this function on permanently. In other cases, such as selective filtration of a specific object or optimization for DOF or exposure, there may be discriminating use of specific corrective functions. In the case of selective user choice, it is possible, by using the present invention, to select a priority sequence of corrections in layers. While specific select layers may be permanently activated, for example to automatically adjust specific optical aberrations, additional sets of layers may be manually selected in order to modify the specific aspects of each image, particularly to adjust or correct digital aberrations. This process can be performed with a single microprocessor, multiple microprocessors, multiple ASICs or a combination of microprocessors and ASICs.

An additional embodiment of the system provides multiple combinations of corrections and effects via multiple independent ASICs, which only perform specific functions, working in parallel. The various tasks are divided into specific-function ASICs for rapid processing. The advantage of this approach is accelerated processing speed in performing multiple simultaneous functions.

(II) Digital Sensor Improvement and Nano-Grids (9) Interchangeable Digital Sensor System Using Both CCD and CMOS to Optimize Best Results Because the main digital sensor types of CCD and CMOS, like film types, each have benefits and detriments, it is sometimes advantageous to provide the utility of both sensor types in a camera system. With the exception of a video camera, which employs three CCDs, the use of multiple sensors has not been adopted. Two generations ago, however, the idea of using a twin reflex camera for medium format photography was implemented. In this case, though focus was coupled between the lenses, one lens was used to see the subject, while the other lens took the picture. This method was used to obtain the benefits of a rangefinder camera with a single lens reflex camera.

The use of two types of sensors in a camera is compelling, because the user benefits from the strengths of both. In the present invention, one sensor is selected from among at least two different types of sensors that are rotated to an active position by the user. One advantage of this approach is that if one sensor experiences a problem, there is a reserve sensor available at the push of a button.

This capability usefully exploits the strengths of each particular sensor. For instance, in situations in which high resolution is required, a CCD may be preferable, while in cases in which increased tonal range or low noise is preferable, a CMOS sensor may be preferable. With this approach, a customer does not need to choose between different types of sensors.

The process of interchanging the two chips is performed by placing the two chips on either façade of a plane that "flips" over (i.e., rotates 180 degrees) upon demand to obtain the requirements of the chosen chip type. This mechanism would fit behind an SLR's mirror and could easily be performed as long as the mirror is in the "up" position. In another embodiment, the chip exchange process can occur by sliding alternating chips into a sleeve from a single location and replacing the non-utilized chip(s) into the reserve compartment. In either event, the camera will detect the chip exchange and will automatically reprogram software functions and settings for the usable chip.

(10) Nano-Grids for Selected Pixels on CCD or CMOS Integrated Circuits to Optimize Selective Modifications of Exposure, ISO and Aberrations in Digital Photography Digital sensors consist of arrays of pixels, arranged in rows, which behave as tiny buckets for converting photons to electrons. As the pixels fill up with light, they are able to discern slight differences in color and exposure and transfer the energy, in the form of electrons, to storage. Charge coupled devices (CCDs) have been the predominant form of digital sensor because they use a form of electronic charge which creates the behavior of a bucket brigade of transferring data, once the buckets in a row are filled up, to successive rows for digital data storage of the electronic charge sets. CMOS digital sensors may be structured with larger bucket pixels, which can increase the depth of the light captured and thus the latitude of light exposure that is stored. However, for the relatively larger buckets to provide increased photon capture capacity, it is necessary to control the width of the opening in the top and the width of the buckets so that the amount of light captured may be modulated.

The present invention introduces a key advance in the ability of digital sensors, particularly CMOS sensors, to modulate the size of the openings of the pixels. Specifically, the present system provides for a nano-grid, or a very small matrix of filaments, which fits over the sensor. The nano-grid is carefully calibrated to match the rows of pixels on the sensor so as to limit the amount of light that each of the buckets may receive. Use of the nano-grid allows a selective closing of the large buckets in order for photons to be restricted. Selective modification of specific pixels on the neutral grid makes it possible to identify specific sets of pixels to correct for various exposure or lens aberrations.

In this embodiment of the present system, data about a specific lens are provided to the camera in order to correct specific lens aberrations, while exposure data is used to modify image capture using nano-grids for optimum image performance.

Nano-grids may be selectively switched at different pixel sites, akin to continuously programmable field programmable gate array (CP-FPGA) semiconductors, which modify architecture in order to optimize effective operation by constantly manipulating the chip's gates.

Nano-grids may be used for specific image modes, for example, nocturnal imaging, which requires more time to read a sufficient amount of light. In this case, a specific software module may provide lens and exposure data to the camera, which then determine the precise composition of nano-grid correction to provide to specific sets of pixels on the digital sensor. In effect, nano-filaments move to positions to effectively block out the full capacity of the pixel buckets and thus change the pixel effects. With use of preset nano-grid positions for particular applications, the identification of specific vectors of nano-filaments is performed, and exposure adjustments are made on specific images in hardware.

The nano-grid is overlaid over the surface of the pixel architecture. The nano-grid is used not only in specific pre-set positions, but it also provides feedback to the post-capture system for analysis and repositioning to achieve the desired effects. One effect of the nano-grid is to manually expand or narrow the range of a set of pixel buckets; this process in turn effectively modifies not only the exposure range but also sharpness at high ISO, thereby dramatically reducing noise. Consequently, it becomes possible, by modifying the pixel bucket width and height, to obtain extremely sharp images with excellent contrast and tonal range even in poor lighting, a feat heretofore impossible.

The nano-grid performs these mechanical functions by moving the nano-filaments in an arc, like expandable windshield wipers. Though nano-grids are particularly useful in CMOS chips, they are also useful with CCDs. In fact, with the advent of nano-grids, CCD pixel size (and density in pixel-rows which will affect the overall sensor size) may be expanded and thus made substantially more versatile.

In a further embodiment of the present invention, multiple screens, or grids, would be placed over the digital sensor. The use of multiple nano-grids provides increased capacity to perform the function of closing off the pixel buckets and, in fact, to completely close off selected pixels to make the image effect completely dark. The combinations of nano-grids behave as multiple screens that move left and right to achieve the desired effect. Although there is a need to periodically calibrate the screens to effect their precise positions, this system will employ an electric charge to push the nano-filaments to the desired locations.

Nano-filaments move to block the space allowing photons to hit the pixel in order to limit the amount of light capacity available to the pixel. The complete darkening of the pixel will result in a total black color in the resulting image.

Exposure data feedback is provided to the digital sensor to effect the precise positioning of the nano-grid(s). In a further aspect of the present system, the camera's computer will anticipate the exposure data by statistically extrapolating from the pattern created by at least three data sets. A microprocessor (or ASIC) controlled nano-grid mechanism will use the feedback to anticipate specific nano-grid positions in order to optimize the exposure and corrective functions.

In one application of the nano-grid, the problem of vignetting in wide-angle lenses may be solved by activating nano-filaments in nano-grid(s) primarily in the corners to correct for the darkening from the limits of the optical aberrations, while still maintaining very low noise in a high ISO (low light) photographic situation. The use of the nano-grid would thus contribute to solving multiple problems.

Nano-grids will also be useful in accurately correcting for both color and exposure detail. In fact, with nano-grids, the capacity of digital sensors' range should be substantially increased, because the chips' pixel bucket sizes can be modulated. Therefore, not only will the lighting and color be accurate, but sharpness and optical aberrations will also be optimized, in ways not possible before.

(11) Integrated Nano-Grids in Digital Sensor

In a further embodiment of the system, nano-grids may be integrated into the digital sensor. In this form of the nano-grid, the nano-filaments are constructed within the pixel buckets in order to increase their accuracy and responsiveness. The nano-filaments mechanically move in various directions to perform the main operation of modulating light into their respective pixels. This method of organizing nano-grids and nano-filaments increases the rapidity of response to feedback. In effect, each pixel has a mask, or flexible lid, contained in it, which may open and close, to allow more or less light into the pixel bucket.

The integrated nano-filaments are activated by oscillation between positive and negative charges. In the context of a CMOS sensor, the transistor networks oscillate between positive and negative charges. This architecture allows a "push-pull" design of nano-filaments in which the negative charge "pulls" and the positive charge "pushes" the activation of the nano-filaments. This charge-enabled nano-grid (CENG) advantageously allows modulating gates (i.e., filaments) integrated into the pixel to reduce spaces between pixels, thereby allowing more pixels to be packed on the same surface area. The net benefit of the use of integrated CENG filaments is that specific sets of nano-filaments will produce specific effects on-demand and allow far more tonal detail than has been possible before.

In a further embodiment of the present system, sophisticated digital sensors may contain combinations of nano-grids that appear on top of the sensor as well as nano-grids that are integrated into the digital sensor. This combination will provide maximum latitude for processing the greatest effect available.

(12) Combinations of Nano-Grids and Digital Corrections Applied to Digital Imaging System Whereas it is possible to exclusively implement nano-grids to control the amount of light penetrating specific pixels, and it is possible to exclusively provide digital corrections as specified above regarding correcting optical or digital aberrations, a further embodiment of the present invention combines the two processes in order to optimize imaging.

Combining these two complex processes makes it possible to modify pixel capacity to maximize exposure latitude, to expand exposure modification and to apply digital correctives for optical and digital aberrations. Hence selective exposure far beyond the limits of present film or digital photography is made possible. The restrictions of film can thus be transcended by using the present system, whereas use of a static and limited digital system would not be sufficient to facilitate these complex corrections.

The unique combinations of these processes also illustrate a complex system that provides feedback from both the environment and the photographer. The photographer may select preset exposure settings that will activate a range of options in both the nano-grids and the digital corrective system, while the lens aberration corrective system is automatically implemented. Once the camera detects specific conditions, such as a broad range of exposure latitude, from very bright to very dark, in the scene, it computes the precise number and location of nano-grids needed to modulate the pixels for optimum exposure with highlight and shadow detail and extreme sharpness, even in relatively low light. The dynamics of these multiple processes present trade-offs in selecting the best available set of selected modifications.

(13) Tri-Well Pixels

As indicated above, one of the key problems with current digital sensors involves dynamic range. There is a need to limit the scope of the space in the pixel well, into which light is captured, then converted into electrons. The challenge with current technologies is to balance details in shadow and highlight areas, particularly to acheive low noise at relatively high ISO speeds.

In addition to the concept of nano-grids, both in surface screen and integrated embodiments, as specified in (10) to (11) above, the present system introduces the notion of three side-by-side differentially-sized buckets within each pixel intended to optimize dynamic range for increased sensitivity. In the most common configuration, the three different-sized buckets are arranged with the largest bucket (in both width and height) in the center, with the second and third largest buckets on either side. The buckets are elliptical and concave in architecture to increase efficiency of fitting together in a round pixel structure. Their structures are semi-circular and elongated. The largest and tallest bucket will be tasked with maintaining the details in highlights, and the smallest will be tasked with maximizing the details in shadows, while the mid-sized bucket will be tasked with maintaining the middle range of exposure details. The pixel will have data from all three buckets available, but will select the data from one or more buckets depending on the exposure details.

The system is analogous to the high fidelity sound technology in speakers with crossovers, whose several frequencies are used by the tweeters, mid-range(s) and woofers; the crossover point at which the frequency changes from one component to another can be modified based on the specific mechanics of each component.

In the case of the multiple buckets in a single pixel, the buckets are connected by filaments to a central grid which captures and stores the electrons. When the photographic scene displays increased light, image data from the larger buckets are selected to be recorded by the processor, while in cases of darkness and increased need for sensitivity, the smaller buckets are selected to be recorded; the mid-sized bucket is used in normal light situations of most cases. Further, this multi-aspect architecture can use pixels in varying positions on the sensor differently, particularly to facilitate processing far more dynamic range and to produce uniform tonal range in scenes that vary more than two or three stops. This novel multi-aspect model solves a number of key problems involving exposure dynamics in digital photography.

In another embodiment of the system, there may be more than three buckets in a pixel, so as to divide out the functions further and create even finer tonal continuity. In a further embodiment of the system, several pixels in a super-pixel allow red, green and blue colors to be segregated by each sub-pixel. This approach will be useful particularly in CCD semiconductors because of limits of this architecture, which require coupling circuitry between pixels to pass a charge between rows of pixels. In this case, outputs will vary between the micro-pixels to facilitate the differential processing required.

While cases of two side-by-side pixels might solve these exposure latitude problems, they represent an inadequate solution, much as a speaker with only two components limits the dynamic range output dramatically in contrast with a speaker with five components. This is similar to comparing a diode and a transistor.

(III) Digital System Improvements that Link Multiple Digital Corrections

(14) Auto Pre-Programmed Modules for Specific Functions in Digital Imaging System To process the functions specified in this integrated digital imaging system, it is necessary for automated pre-programmed modules to detect the specific lens type and the specific digital sensor(s) used to assess the appropriate corrections or alterations. The purpose of the pre-programmed modules is to access a preset library of (a) typical corrections of lenses, (b) typical scene types with appropriate exposure modes, (c) specific effects that may be selected and (d) specific sensor functions. It is important to match a particular lens to a particular sensor type so that adjustments are calibrated to this pairing. The processing software is stored in either a microprocessor or an ASIC in order to process the images after they are captured by the sensor but before they are transferred to storage on a memory device.

In another embodiment, the system processes image corrections after the digital data is stored and constantly accesses the original stored data file in the production of a corrected file. This process allows for immediate data processing and storage which affords more time to accomplish specific corrective functions. There are thus cases when real-time correctives are neither necessary nor possible. Such increased processing capability may also facilitate a more complete corrective task.

In an additional embodiment, because similar correctives and effects may be provided to images that share the specific combination of lens and sensor, in order to accelerate the process of optimizing the images, batches of similar images may be processed together. This batch processing method may include the creation of duplicate images for each image captured, including a RAW image that contains no changes to the native image capture and a simultaneous auto-corrected image. The optimized image may be simultaneously compressed, to maximize storage capabilities, while the RAW image may be left uncompressed so as to maintain original detail.

(15) Apparatus and Process for Affecting Pre-Sensor Optical and Digital Corrections in Digital Imaging System Given the nature of light transmission, not all optical corrections are optimized by modification after the image is captured by the sensor. Though a range of important corrections and effects may be made after image capture, such as correction for optical or digital aberrations, there are several types of corrections that are required to be made before the light reaches the sensor. One example of this pre-sensor digital correction involves the use of a low-pass or anti-aliasing filter that resides in front of the digital sensor to minimize moiré and aliasing digital problems (although the use of this filter adversely affects image sharpness).

In the case of optical corrections, one class of filter that requires use before the digital sensor is the polarizing filter, because once light is captured on the digital sensor, the polarizing effect will not be available. Another type of correction that involves use of a filter or lens before the digital sensor is the close-up filter. This latter solution allows a lens's closest focusing plane to be closer to the front of a lens and has the effect of diminishing the rear plane of the depth of field. The close-up filter may be optimized for use with floating rear-element group lenses which allow increasingly close focusing. In one embodiment of the system, specific pre-sensor optical filters may be used to provide polarization and close up corrections. The use of in-camera optical (circular) polarization would help standardize this valuable process and eliminate the need to maintain several external polarizer filters for each lens mount.

Since the present system entails an embodiment which uses nano-grids to perform specific exposure modifications before the light hits the digital sensor, it is possible to use these nano-grids for the applications of polarization and close-up filter. These filtration capabilities occur between the lens and the digital sensor.

In order to optimize the use of pre-sensor filtration, an image is initially tested and analyzed before the optimized corrections are activated and the pre-sensor changes are made. This process is analogous to the use of automated flash photography in which a feedback mechanism is provided; a scene is evaluated, and the initial flash data analyzed and modified to correspond to the correct exposure before a final flash is produced.

Because the camera system processes post-capture data, in order to optimize images for optical and digital problems, as well as continuously makes changes to pre-sensor filtration, multiple ASICs work in parallel to make the conversion of the image after capture. The use of parallel ASICs to perform specific correction processes solves the problem of capturing images and making post-capture corrections while simultaneously adapting the pre-sensor filtration system.

As an alternative embodiment of the system, a microprocessor (and software) may perform specific pre-sensor adjustments while the ASIC(s) performs specific corrective functions. In another embodiment, the ASIC(s) may perform the specific pre-sensor adjustments while a microprocessor (and software) will perform the specific corrective functions.

(16) Integrated Digital Imaging System for Optical and Digital Corrections with Feedback Dynamics Because the present system consists of, and uses, complex sub-systems, including an auto-focus mechanism, an auto-exposure mechanism, a shutter mechanism, an automatic flash mechanism, a digital sensor mechanism, a digital processing mechanism and a digital storage mechanism, it is possible to realize interaction dynamics that contain feedback. The interactive process of operating these sub-systems involves a learning progression. The image is analyzed, solutions are tested and an optimal solution is selected and implemented, all in real time. By choosing a specific logic vector in a decision tree involving an initial variable, the process begins again with another key variable in real-time until the final image is captured and optimized.

In order to accomplish these complex processes, specific variables, such as aperture data, shutter speed data, lens data, digital sensor data and subject type are registered and analyzed by the camera. As environmental data changes, the camera mechanisms adapt to the environmental and the photographer's situation.

In order to accelerate these processes, the camera learns to anticipate the user's behaviors, the user's preferences and the subject's behaviors. By providing user-adjusted setting modifications for optical and digital corrections, the camera establishes a reference point for processing rapid image changes. In particular, the camera's software will analyze trends in the user's pattern of behaviors and preferences as well as pattern changes in the subject's behaviors. Anticipation processes are programmed into the autofocus and automated flash systems because of the extremely rapid reaction-time requirements of these specific mechanisms.

In one embodiment of the system, a method of processing a chain of rapid image captures is to employ computer-caching techniques in which a first image is processed in a normal way while later images are processed in an accelerated way. This is possible because the first image provides data to the system to analyze; these data then allow the system to anticipate further similar images and to use similar auto-focus and auto-exposure data. The optical and digital corrections are performed in a batch fashion by applying similar changes to near-identical image problems in order to dramatically accelerate the processing speed of a chain of images. This caching and anticipation approach is very useful in fast-paced action photography.

Another embodiment of the process of rapidly capturing a chain of images in sequence employs multi-threading techniques. Dividing the functions between specific subsystem ASICs allows multiple corrections to be performed in a parallel cascade for efficient task completion. One advantage of breaking down functions to specific processors is the acquired ability to start on one function and, while the system is in the process of completing a task, to begin other tasks. This process eliminates the lag between the specific subsystems.

(17) Adaptive User Pattern Learning with User-Programmable Functions in Digital Imaging System In order to optimize its functions, the camera needs to learn about the user's preferences. When the user uses the camera, the camera evaluates the use patterns. Since the camera is programmed with a database of common user patterns, it can identify common uses and anticipate common uses of similar users by employing a "collaborative filtering" mechanism (i.e., if you like this camera setting, you should like this other setting because similar users who have liked the first setting have also liked the second setting). By anticipating common uses of each camera user, the camera optimizes its functions for each use and for each user. In effect, the camera's learning of user preferences is a sort of guided process of experimentation. Evolving algorithms learn about the user from actual use patterns.

One positive effect of this learning process of the camera about the user's patterns of behavior is that the filtration process becomes adaptive. The camera builds an initial map of the user's preferences from the user's actual selections. From the starting point of common types of personal selections, the camera uses standard templates of main types of uses that are fulfilled for each user's applications. For instance, if a photographer typically takes portraits with a traditional portrait lens, the camera will be aware of this and will activate filtration processes that are optimal for this type of portraiture photography, such as instilling limited depth of field on a subject and out-of-focus foreground and background. Contrarily, if landscape images are selected, depth of field will be increased substantially and the lens focused on either infinity or a medium point depending on the specific type of subject matter. The camera builds a model for each user based on the accumulation of experience.

In order for the camera to learn about the preferences of a specific user, the camera must adjust to each particular user, much as each individual identity must log onto a computer network privately.

Since the dynamics of the combined subsystems are complex, and adaptive, it is necessary that automated adjustments be interactive. Once detection of the lens type, the sensor type, the exposure settings, the user and the subject is made, optical and digital distortions are identified and specific combinations of corrections are applied both before and after the digital sensor in order to optimize the image. All of this is accomplished in less time than the blink of an eye.

(18) Software Privacy Function in Digital Imaging System

Because digital camera systems are able to use software and wireless mechanisms for their operation, it is possible to activate aspects of the camera remotely. Conversely, it is possible to disable operations of the camera remotely.

The present invention embodies a capability to externally disable the camera remotely in specific locations that require privacy, such as secret government areas (courthouses), private homes or businesses that are image-free zones. In these cases, a signal from an external source is provided to disable the shutter from firing. This black-out capability will allow external control of access to specific sites. As a condition of access, only a camera with this feature may be admitted to public buildings, so that even if the camera is permitted to operate, permission is only conditional. For instance, the owner of the building may allow the camera to function only in a specific set of rooms but not in others. Cameras without this feature may not be allowed in private spaces where control must be externally restricted.

This blocking feature will require the addition of specific blocking software, which may be automatically downloaded as one enters specific buildings. Similarly, in order to be granted permission to access the camera, or specific functions of the camera, the downloading of a "key" may be required.

Moreover, a further embodiment of the system may make it necessary to download software keys to get access to filtration capabilities in the camera in order to obtain optimum images. For example, the user may be required to pay a fee to download software in real time that will permit her to access a particular function in the camera to obtain a critical image. A spectrum of quality and complexity in filtration capabilities may be made obtainable for a range of fees on-demand. Therefore, the external downloading of software for the camera need not be limited to a black out function.

(IV) Dynamic Digital Imaging System Improvements that Apply to Zoom Lenses and Video Imaging

(19) Dynamics of Zoom Lens Corrections in Digital Imaging System

Whereas the optical aberrations of prime (fixed focal length) lenses were discussed above, the modulation of optical aberrations of zoom lenses is another problem to consider. As a wholly different species of lens, zoom lenses have become extremely complex optical mechanisms consisting of multiple groups of lens elements. The general problem with zoom lenses is the trade-off that must be made: To minimize the distortions of the widest possible focal length, distortions become maximized at the longest possible focal length, and vice-versa. Consequently, zoom lens architecture is inherently compromised on image quality. Over the years, lens designers have developed lens formulas that have dramatically improved image quality and that compete with typical prime lenses. As an example of this evolution in quality, the class of 70-200 f/2.8 35 mm zoom lenses, now in their sixth generation, has supplied substantial improvements over earlier telephoto zooms. However, in general, zoom lenses have more aberrations than primes and thus require increased optical corrections. The need to solve the problem of zoom lens aberration correction is accentuated by their increased use in photography because of their simplicity and versatility.

The dynamics of the zooming process present specific difficulties for the purposes of correcting optical aberrations in digital imaging systems. With fixed-focal length lenses, the camera can detect the lens and provide an immediate consistent modification for a varying range of apertures. In the case of zooms, however, where the focal-length is not fixed, the adjustments must correlate to the changes in the focal length. In effect, this condition presents a continuous resampling process. When combined with changing scenes, the zooming process requires far faster responses to changing inputs by the camera system. This process resembles the tracking of a kaleidoscope's changing image structures as the wheel on the device is constantly turned.

In order to solve the problem of distortion at the wide-angle part of select zoom lenses, manufacturers have been using aspherical elements which are complex shapes that require special production techniques. On the other hand, in order to solve the problem of chromatic aberration in select telephoto lenses, manufacturers have used extra low dispersion glass elements, particularly at the front of the zoom lens. Since there are generally three main classes of zoom lenses—wide-angle to wide-angle, wide-angle to telephoto and telephoto to telephoto—aspherical elements have been used in wide-angle zoom lenses, while extra low dispersion glass has been used in the telephoto zoom lenses and both kinds of lens elements have been included in the wide-angle to telephoto zoom lenses.

The changing focal lengths of zoom lenses add a variable to the complex set of variables of the interacting sub-systems in the digital imaging system. The digital camera system must therefore track the movement of the changes in the focal lengths in zoom lenses and continuously make modifications to the varied optical aberrations in these types of lenses. Unlike in fixed focal length lenses, the aberrations change at different focal lengths in zoom lenses, and the camera must track these changes.

The present system is designed to make the corrections to these changing aberrations in zoom lenses by noting the changed focal length at specific times of each lens. For a fixed focal length lens, the camera refers to a database of information to provide information to correct specific types of aberrations; for a zoom lens, the camera's database contains multiplex information for each focal length in each respective zoom lens type. This is as if each zoom lens contains a combination of multiple lenses of specific focal lengths. When the zoom is moved to a new focal position, the camera reads the lens as a specific focal length and makes corrections to aberrations based on this specific setting. Although the camera reads the zoom lens at a specific moment in time and adjusts the necessary modifications to correct for aberrations at that specific focal length at that time, overall the zoom lens requires the camera to rapidly make these adjustments.

Since zoom lenses employ dynamic processes of change, it is possible to track a moving subject in real-time by changing focal length from a stationary vantage. These changed focal length positions are tracked by the auto-focus system, but also by the auto-exposure system in the camera. The present system thus allows for zoom tracking in order to anticipate the direction of zoom lens changes, much as the focus on the moving subject involves focus tracking mechanisms. These systems use fuzzy logic and evolutionary algorithms to anticipate the movement of the subject and thus of the focal length change of zoom lens. In this way it is possible to accelerate the lens aberration correction process using zoom lenses.

Because the zoom lenses typically increase aberrations precisely because of the lens design compromises, these types of lenses are ideally suited to the present digital imaging system. The present system allows the zoom lens to be used at high quality without needing to stop down the aperture, thereby resulting in superior photographic opportunities.

(20) Dynamic Changes in Video Corrections of Digital Imaging System

While the zoom lens presents the need to provide a dynamic solution to the process of making corrections to optical aberrations, video photography provides another case of a process that requires dynamic solutions. The same principles that apply to still photography apply to video; auto-focus variability, aperture and depth-of-field variability aspects, shutter speed variability aspects, differences in lens focal length and artificial lighting variability suggest that video be viewed as merely a very rapid (30 to 60 frames per second) application of still photography. Nonetheless, video presents new classes of dynamic problems, most notably regarding the matter of tracking changing subjects in real time.

The process of shifting subject positions, even if the camera is stationary, presents a change of multiple variables that require the automated subsystems (auto-focus, auto-exposure, auto-flash, etc.) to be integrated. Feedback is presented by subjects in the external environment with changing focus and exposure variables. In these cases, even with a modulating shutter speed, the three main variables of change are a zoom lens to continuously change the focal length, auto-focus to track a subject and aperture modifications to continuously change depth-of-field.

The unique dynamics of these complex sub-systems presents particular challenges for a digital imaging system to produce rapid results with the use of advanced ASICs and microprocessors. By incorporating techniques that track objects with advanced auto-focus mechanisms, anticipate zoom lens changes and predict optimal exposures as well as make automatic corrections to both optical and digital aberrations in real time, the present system continuously optimizes the video imaging process.

(21) "Stationary-Scene Object-Motion" Caching Process, with Application to Video, in Digital Imaging System Because video imaging processes employ full motion activity, particularly of subjects in the environment, tracking a subject in a video system is problematic. Once a subject is identified and selected, the subject is automatically tracked with auto-focus and auto-exposure mechanisms by a zoom lens apparatus. There is a particular need to identify and track a subject within a broad stationary scene.

The present system accomplishes this task by using anticipatory object-trajectory tracking. The parts of the stationary scene that are not being tracked are cached. In other words, precisely because the background of the scene is stationary, this part of the scene is not tracked for focus or exposure. On the other hand, the object in motion is identified and tracked by subtracting the extraneous data of the stationary scene. Multiple objects are tracked by comparing data about these combinations of objects and their relations and determining the appropriate exposure and focus settings.

While Monte Carlo processes use random settings to self-organize an initial map, which are useful as a baseline for the purpose of anticipating tracking data sets, the present system subtracts the known information about the specific object(s) being tracked from the stationary background in the environment. In other words, the background data is "blanked out" in a caching process while the main subject(s) are tracked. By so using these techniques, the camera system can efficiently calculate the modifications needed to optimize the video scene.

In a further embodiment of the system, a chip-set is enabled in video display devices (i.e., video monitors) to implement select corrections for optical and digital distortions. The user may modify settings for automating the process of achieving optimum video images.

(V) Digital Image Networking

(22) Network Coordination of Fixed Sensor Grid to Track Multiple Objects in Digital Video Imaging System While the previous discussion has focused on employing a single camera to capture images, the present system is also useful for networking sensors in a sensor grid in order to track multiple objects. Specifically, the present system may be used in surveillance and reconnaissance situations to track objects over time. Using a grid of image sensors with overlapping range parameters makes it possible to organize a complex network of sensors for surveillance activities.

After selecting specific objects to track, the system follows the objects as they move from location to location, appropriately modulating the focus, the lens focal length, the ISO and the exposure settings. As the subject moves from one section of a grid to another, the sensors are coordinated to "hand off" the object to other sensors on the grid, much like a cellular phone network hands off calls between cells.

In another embodiment of the present system, the cameras in the network may be mobile instead of stationary in a fixed sensor grid. In this case, self-organizing aspects of the mobile sensor grid track mobile objects in real time. One application of this complex system, which draws on earlier work in collective robotics, is in cinematography, which requires multiple transportable perspectives of mobile subjects. The complex dynamics of a mobile sensor network provides complex feedback in this manifestation of the present system.

(23) Automatic Wireless Off-Porting of Back-Up Images to External Data Bank

Because the present system uses digital files, it is possible to move these files to an external site for storage. The present system has capabilities to off-port images to an external data bank automatically. This feature is valuable in order to preserve on-board storage capability.

Whether implemented in a local area network (LAN) or a wide area network (WAN), by using a built-in wireless router, the present digital imaging system may be set to send data files directly and automatically to hard-drive storage either in a device in the same room or uploaded to the Internet for storage around the world. This capability is critical for managing massive files of large sensor data sets and preserving valuable in-camera storage space. When automatically sending data files to a nearby computer, the computer may act as a data-port relay to automatically resend the images to an Internet site for storage. The system will maintain the option of keeping some images in the camera and sending duplicate copies of digital files of images to another site for storage as a backup. This automatic back-up process provides insurance for the photographer.

In another embodiment of the system, just as image files are off-loaded to external storage, software files are periodically downloaded to the camera in order to update the camera settings and the database system. For example, as the camera manufacturer provides new lenses for the camera, it becomes necessary to load new updated settings to accommodate corrections for the new lenses. Similarly, as the camera requires new software updates with improved algorithms to further optimize the corrective functions of both the optical and digital mechanisms, the camera will automatically accept these. This feature is particularly important to both manufacturer and user because the ability to update software capability periodically will protect a user from needing to upgrade major hardware such as with a lens replacement.

(24) Image Organization System

The present digital imaging system does not merely allow for the storage of image data files on external storage. Because of the problems of protecting storage and the need to make multiple back-ups in the digital sphere, it is also necessary to store digital image files in multiple database locations. The images are organized in a main database by various criteria, such as time, location, subject-type, etc., and then rerouted to various locations around the world for safe storage. While specific sets of images may be stored together, the need to identify the locations is less important than the need to have control of the main database list which identifies the locations.

In order to maintain security, the digital imaging files may periodically be rotated randomly between locations. Only the main database list, which is constantly updated, maintains information on their location. In fact, specific digital bits of a single image may be maintained at different locations in order to maintain further security. Thus, on many computers around the world bits of each image may be stored, and continuously rotated, with constantly updated registries maintaining their complex hybrid whereabouts. These rotation storage functions are performed by a randomizer logic engine.

In a further embodiment of the present system, once the digital files are off-loaded from the camera system to external storage, specific images may be automatically identified and further specific corrections automatically provided.

In yet another embodiment of the system, the images that are off-loaded from the camera to the external storage system are organized according to various criteria, such as accuracy of focus or exposure or quality of image type, in order to be automatically prioritized. The camera, with the assistance of an initial setting of user priorities, will automatically order new images with a higher or lower priority relative to other images and camera settings. Thus, at the end of a day, the images may be displayed in an order preferred by the user. Lesser images will be automatically routed to a lower position as they do not meet specific criteria, and better images will be routed to a relatively higher position in the organization of files. This feature of automatically assisting in the organization of the digital image files is a very useful one which will save photographers time.

(25) Wireless Digital Image System Automatically Generating Prints from Image Capture The present digital imaging system not only automatically off-loads digital image files to remote locations for storage; the system also will allow one to photograph an image (or sequence of images) in one location (i.e., Paris) and instantly print it in another location (i.e., Los Angeles) for publication in real time. In addition, an image may be captured by the camera and instantly uploaded to a pre-programmed Web site for publication by using wireless technologies. In addition, it is possible to automatically print the digital image file anywhere in the world virtually the moment the image is taken. This system makes this instantaneity particularly possible precisely because the image corrections are automated in-camera. Since there is no need in most cases to further edit the image files, they are thus generally ready for immediate release.

DESCRIPTION OF THE DRAWINGS

FIG. 1 is a schematic drawing of a digital imaging system.

Figure 2:
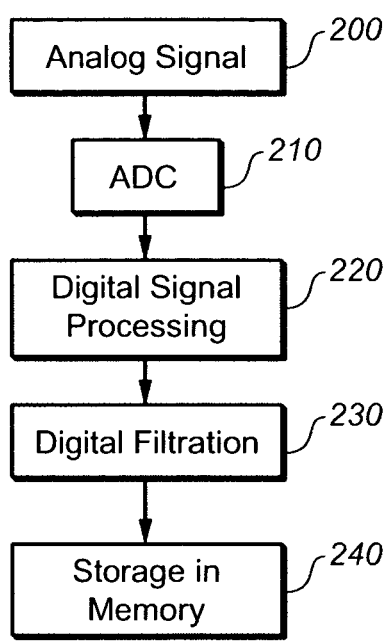
FIG. 2 is a flow chart of an analog to digital signal process.

FIG. 2 is a flow chart of an analog to digital signal process.

Figure 3:
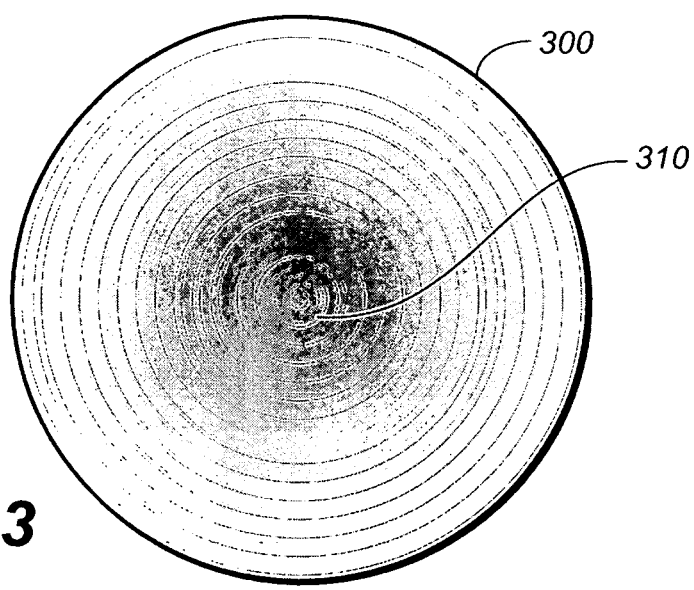
FIG. 3 is an image of the vignetting corrective filter in an optical lens.

FIG. 3 is an image of the vignetting corrective filter in an optical lens.

Figure 4:
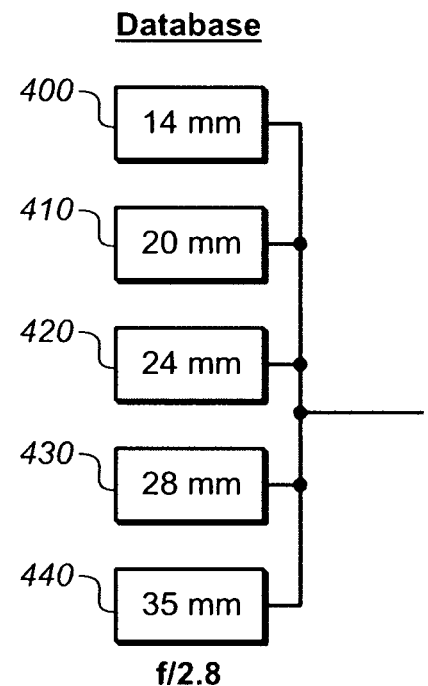
FIG. 4 is a list of wide angle 35 mm lens types.

FIG. 4 is a list of wide angle 35 mm lens types.

Figure 5:
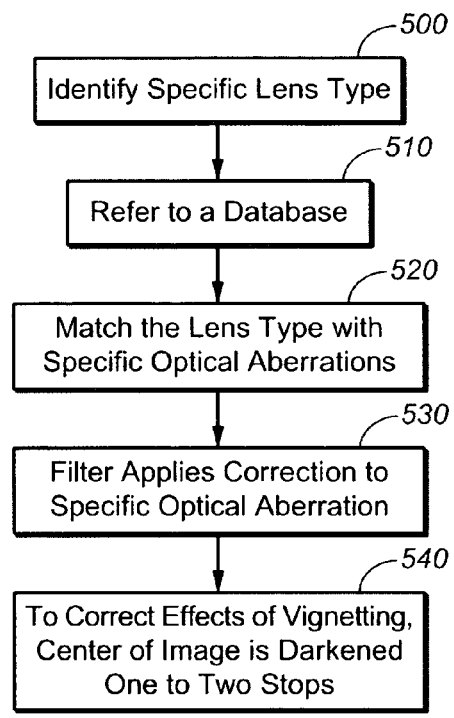
FIG. 5 is a flow chart of the digital corrective process.

FIG. 5 is a flow chart of the digital corrective process.

Figure 6:
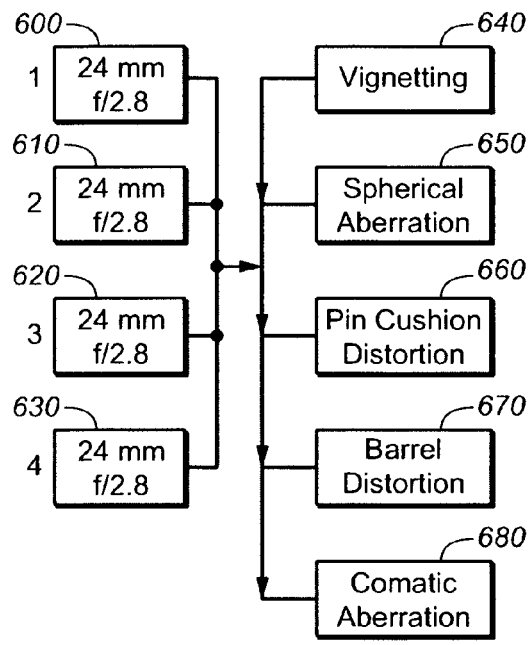
FIG. 6 is a schematic diagram of different types of optical aberrations in different configurations of the same lens.

FIG. 6 is a schematic diagram of different types of optical aberrations in different configurations of the same lens.

Figure 7:
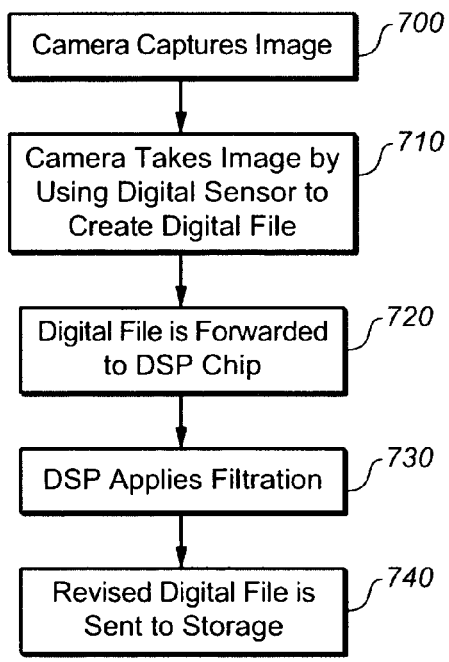
FIG. 7 is a flow chart of the process of digital image capture, processing and storage.

FIG. 7 is a flow chart of the process of digital image capture, processing and storage.

Figure 8:
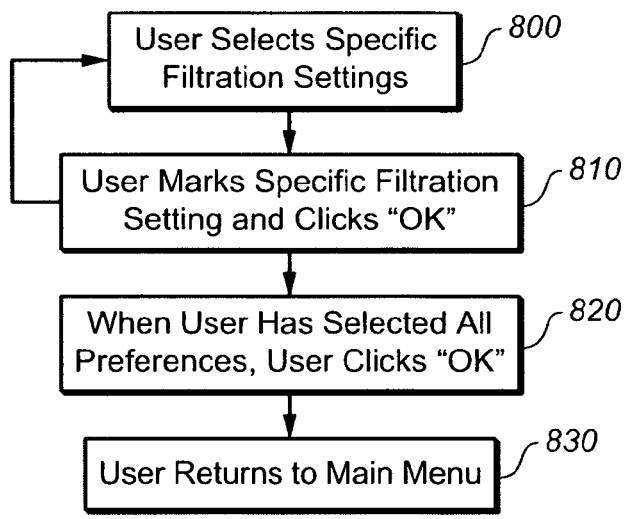
FIG. 8 is a flow chart illustrating the process of selecting filtration settings.

FIG. 8 is a flow chart illustrating the process of selecting filtration settings.

Figure 9:
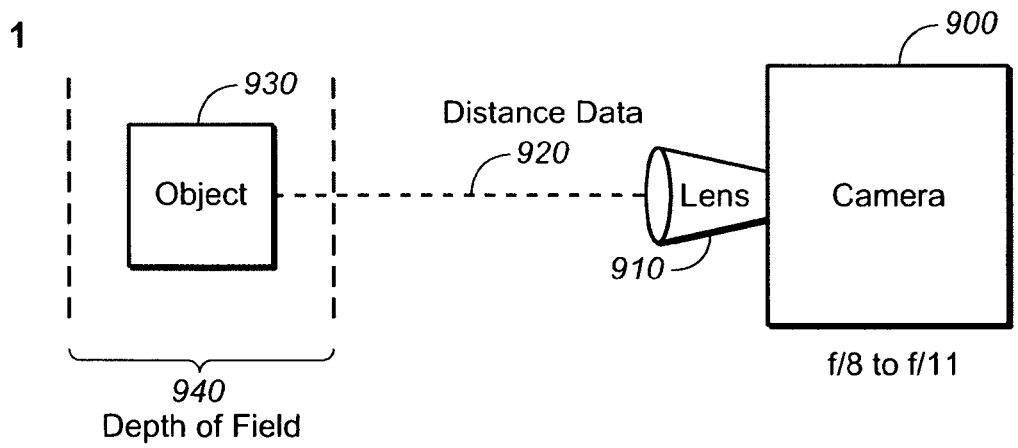
FIG. 9 is a pair of diagrams showing the varied depth of field optimization at different apertures.
Figure 9:
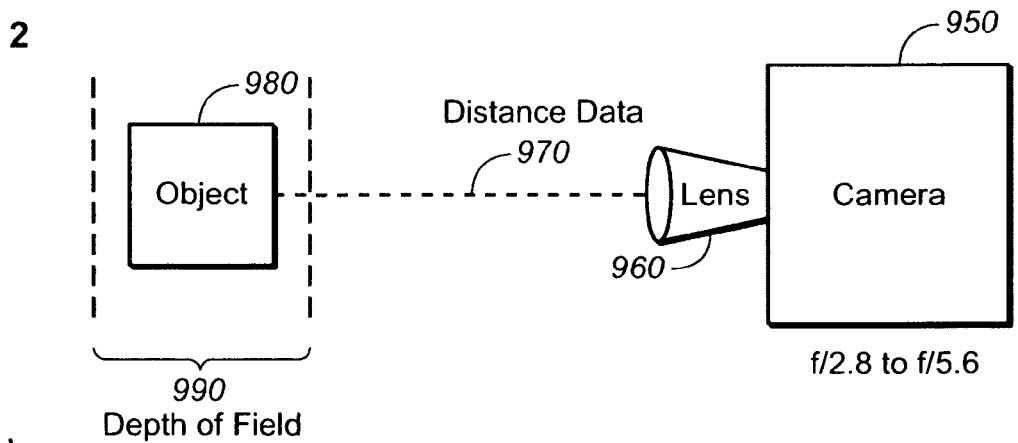

FIG. 9 is a pair of diagrams showing the varied depth of field optimization at different apertures.

Figure 10:
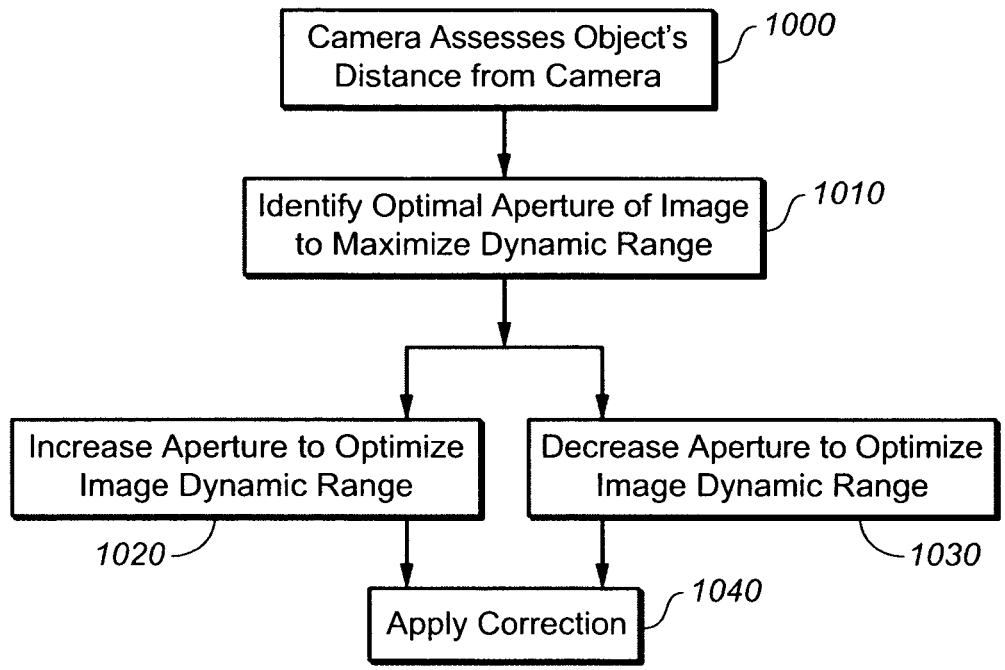
FIG. 10 is a flow chart showing exposure optimization using digital correction in camera.

FIG. 10 is a flow chart showing exposure optimization using digital correction in camera.

Figure 11:
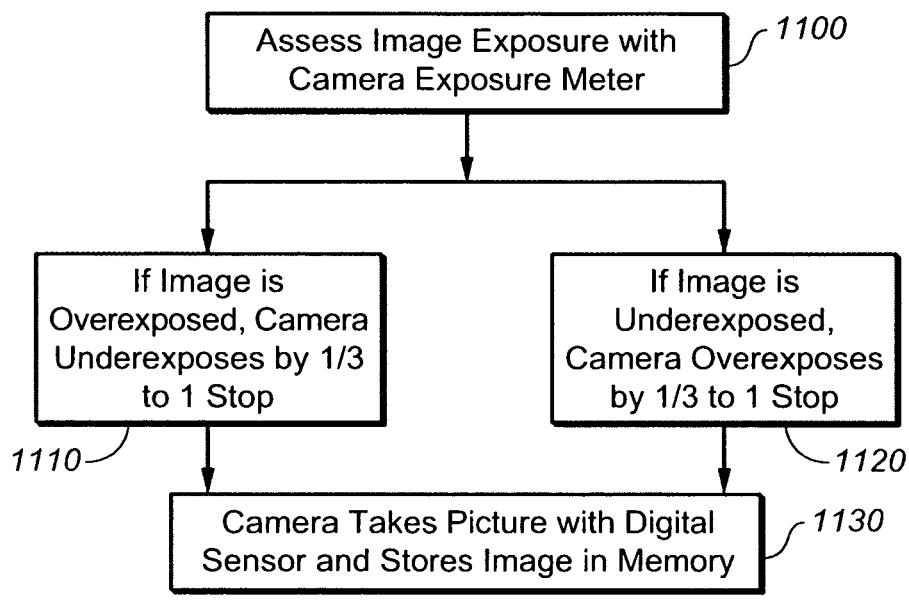
FIG. 11 is a flow chart illustrating the use of in-camera special effects filtration.

FIG. 11 is a flow chart illustrating the use of in-camera special effects filtration.

Figure 12:
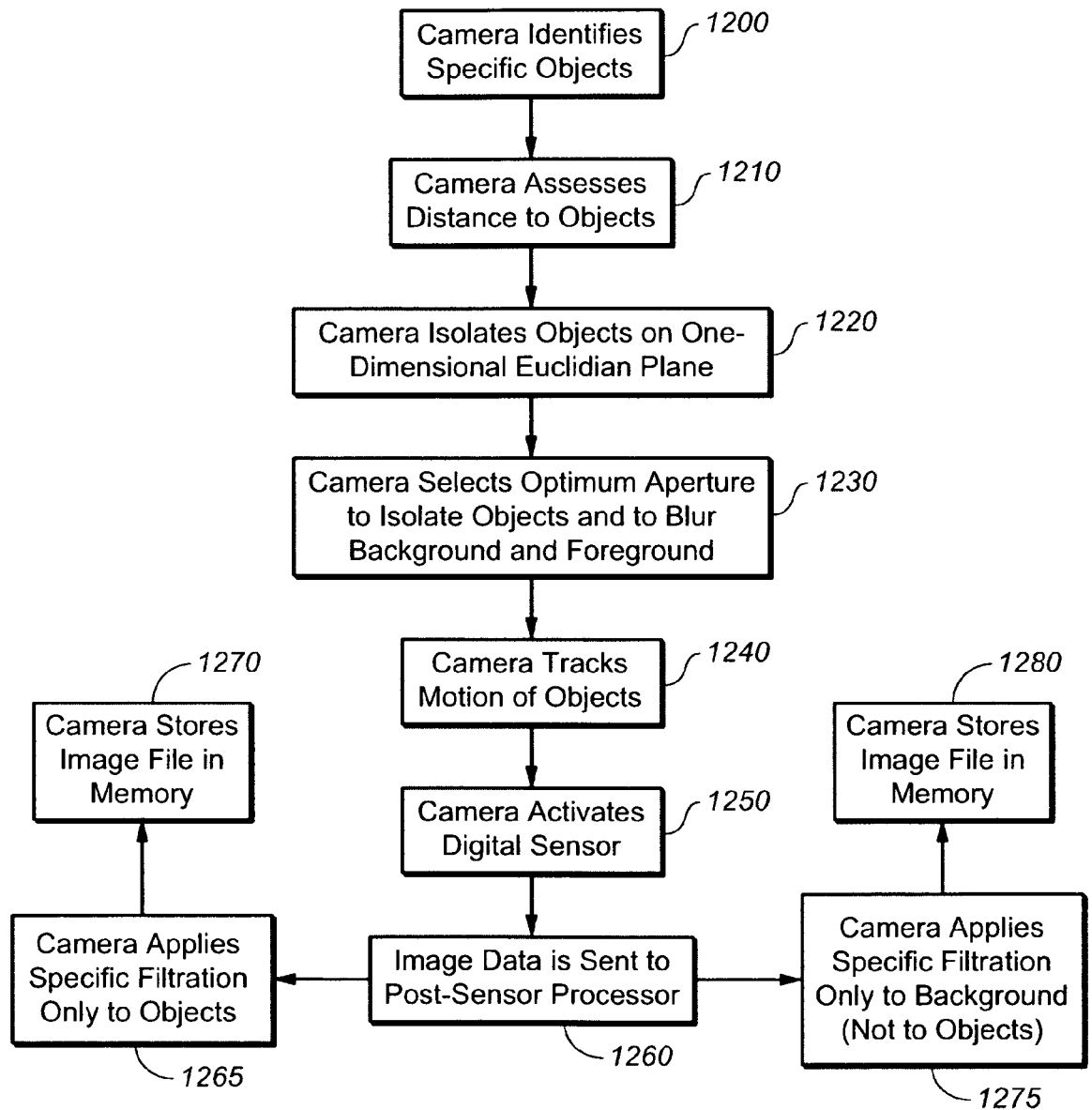
FIG. 12 is a flow chart showing the selective in-camera filtration of specific objects.

FIG. 12 is a flow chart showing the selective in-camera filtration of specific objects.

Figure 13:
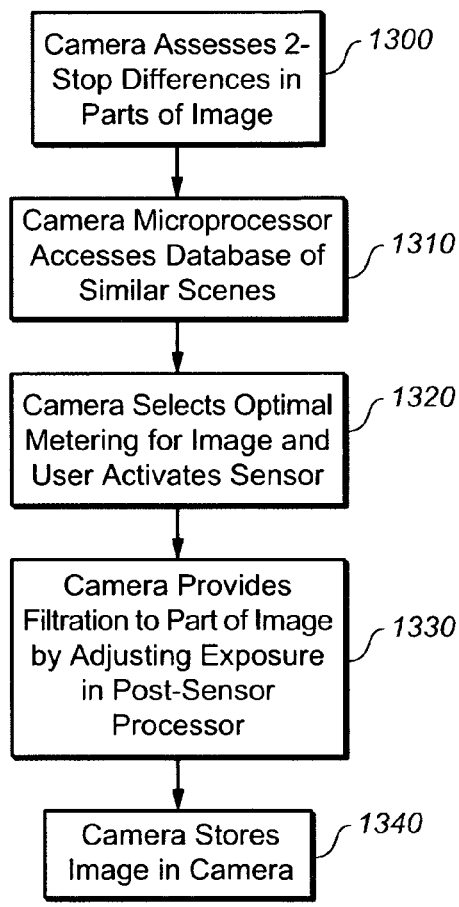
FIG. 13 is a flow chart describing the exposure adjustment of an image using in-camera filtration.

FIG. 13 is a flow chart describing the exposure adjustment of an image using in-camera filtration.

Figure 14:
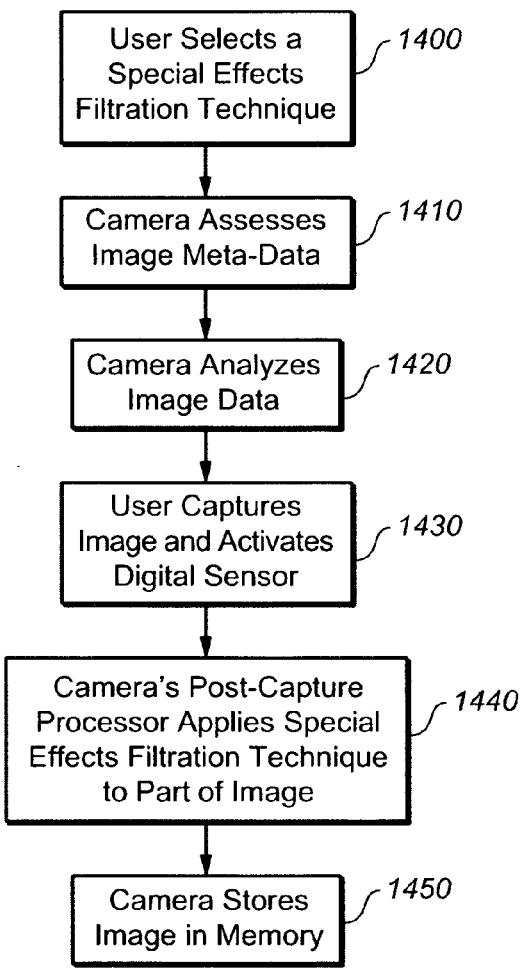
FIG. 14 is a flow chart showing the process of in-camera special effects filtration.

FIG. 14 is a flow chart showing the process of in-camera special effects filtration.

Figure 15:
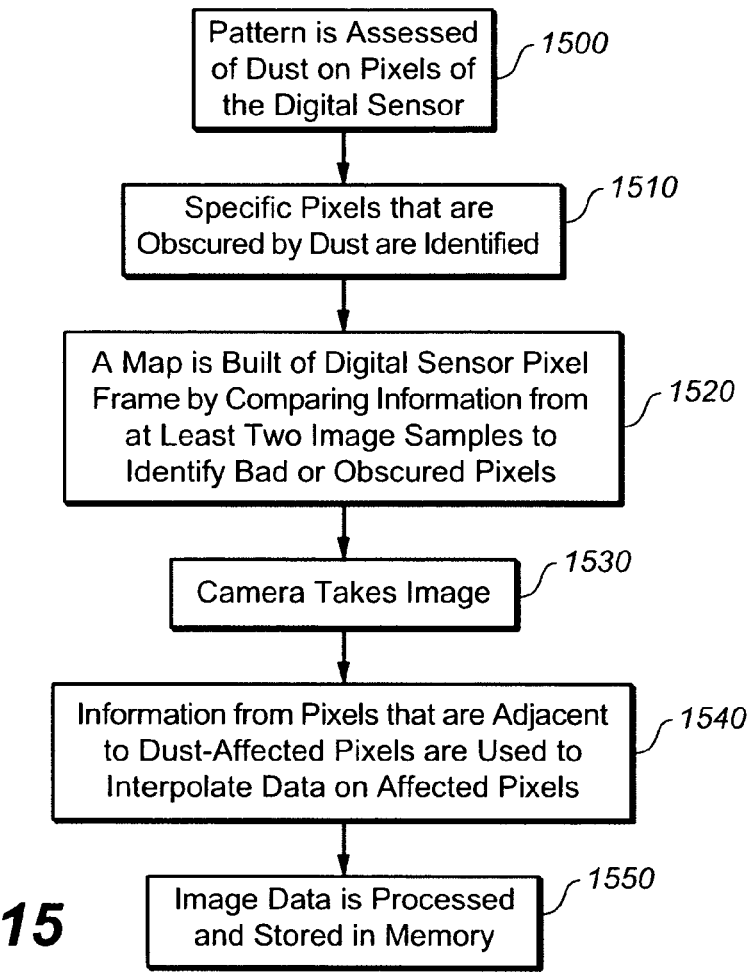
FIG. 15 is a flow chart showing the process of in-camera digital correction for sensor dust.

FIG. 15 is a flow chart showing the process of in-camera digital correction for sensor dust.

Figure 16:
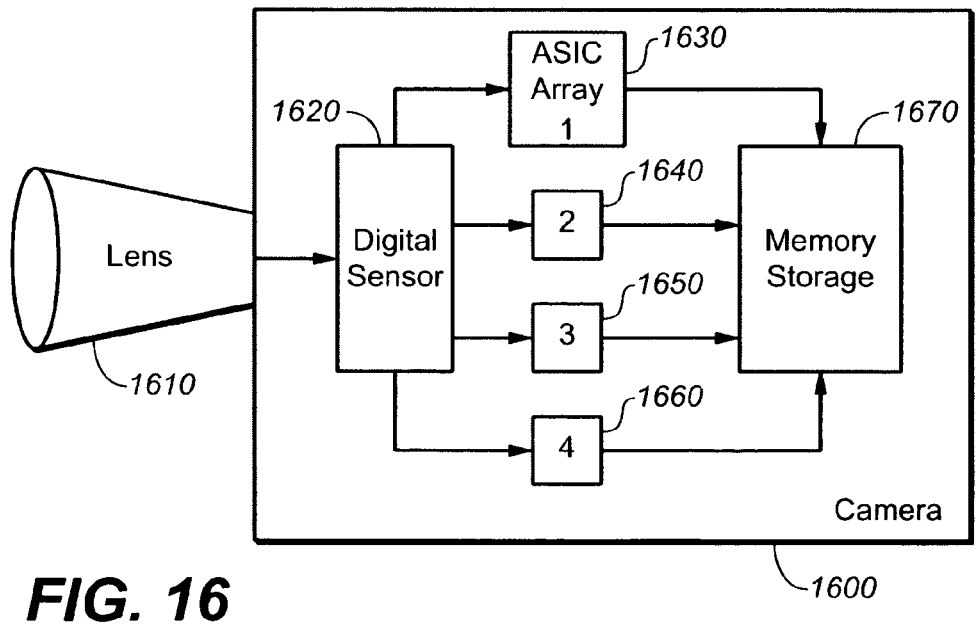
FIG. 16 is a diagram showing a digital camera with an ASIC array.

FIG. 16 is a diagram showing a digital camera with an ASIC array.

Figure 17:
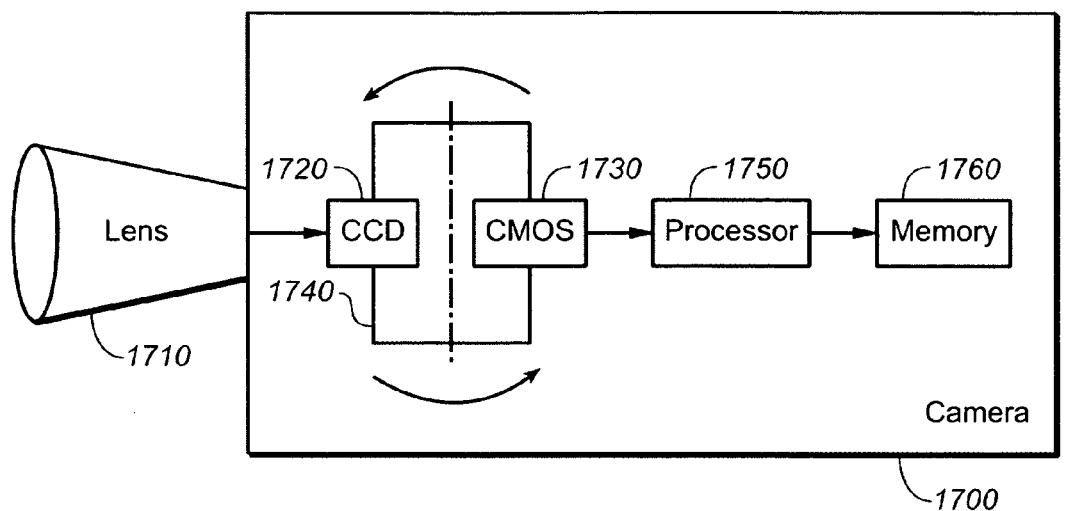
FIG. 17 is a diagram illustrating a digital camera with interchangeable CCD and CMOS sensors.

FIG. 17 is a diagram illustrating a digital camera with interchangeable CCD and CMOS sensors.

Figure 18:
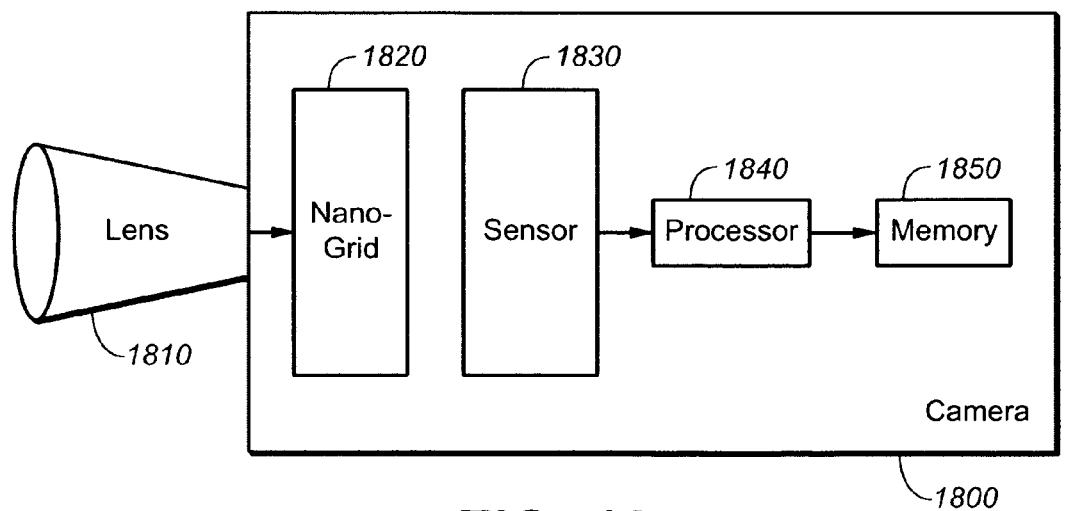
FIG. 18 is a diagram of a digital camera with a nano-grid before the sensor.

FIG. 18 is a diagram of a digital camera with a nano-grid before the sensor.

Figure 19:
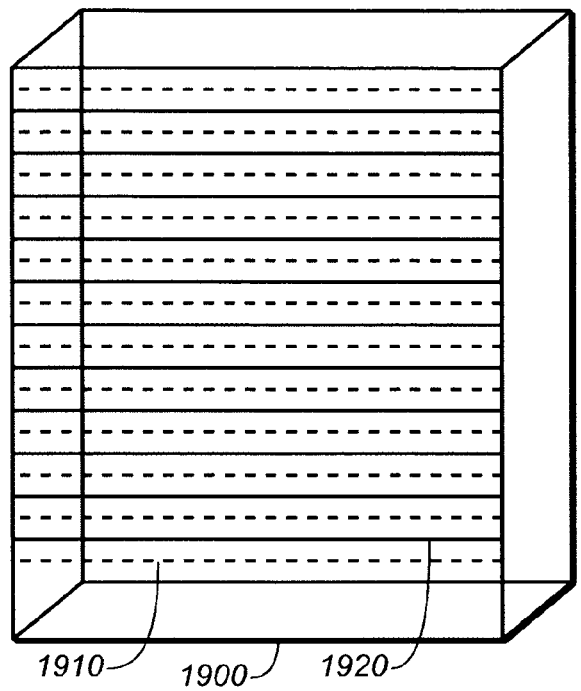
FIG. 19 is a diagram of a nano-grid.

FIG. 19 is a diagram of a nano-grid.

Figure 20:
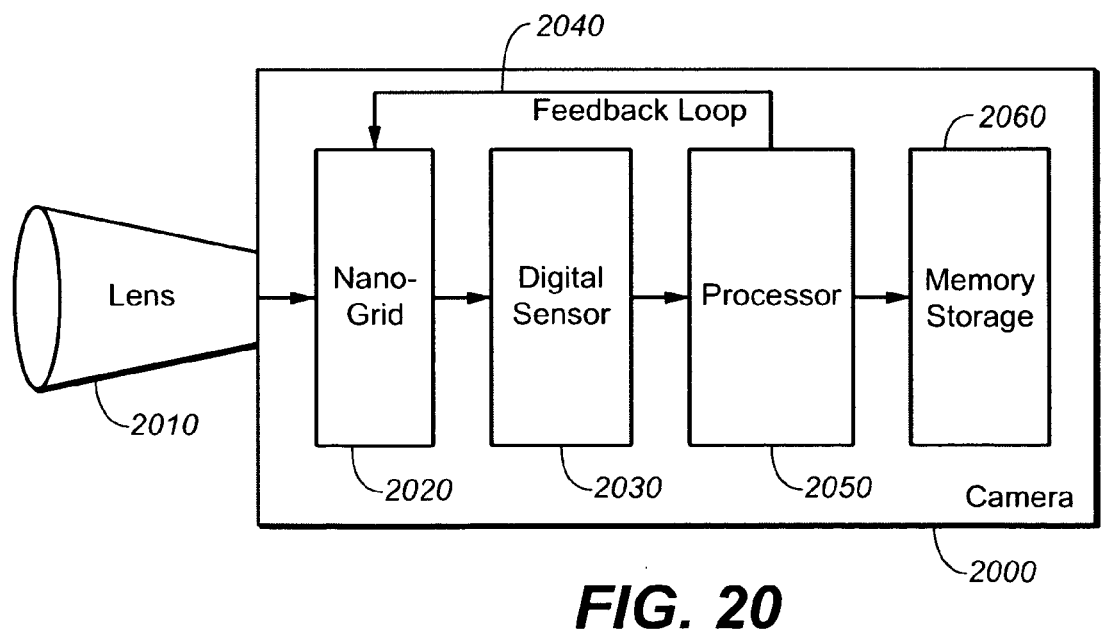
FIG. 20 is a diagram showing the feedback loop connecting the processor and the nano-grid.

FIG. 20 is a diagram showing the feedback loop connecting the processor and the nano-grid.

Figure 21:
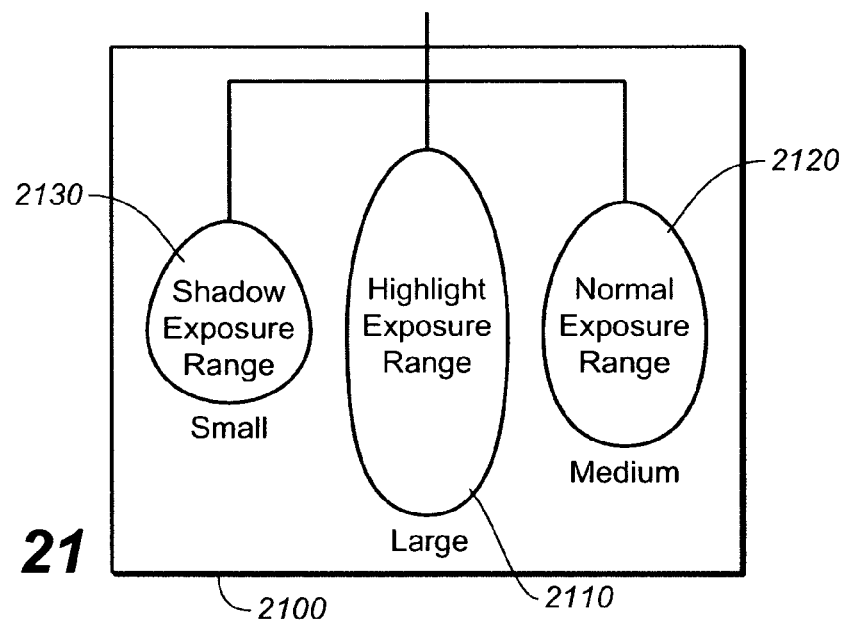
FIG. 21 is a diagram illustrating the tri-pixel architecture in a digital sensor.

FIG. 21 is a diagram illustrating the tri-pixel architecture in a digital sensor.

Figure 22:
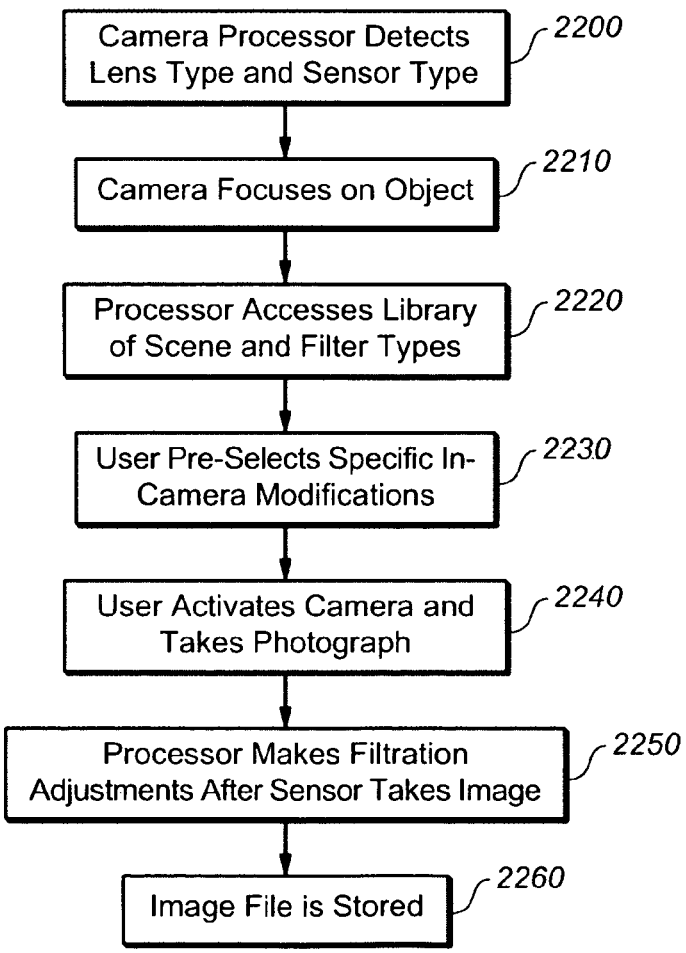
FIG. 22 is a flow chart showing the pre-programmed modules for in-camera functionality.

FIG. 22 is a flow chart showing the pre-programmed modules for in-camera functionality.

Figure 23:
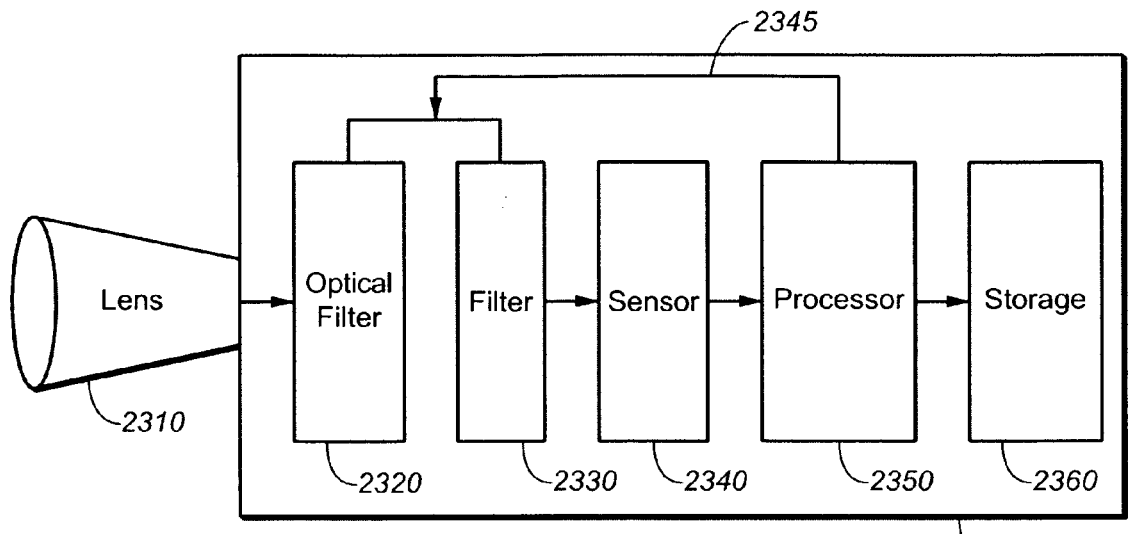
FIG. 23 is a diagram showing the pre-sensor modification process in a digital camera.

FIG. 23 is a diagram showing the pre-sensor modification process in a digital camera.

Figure 24:
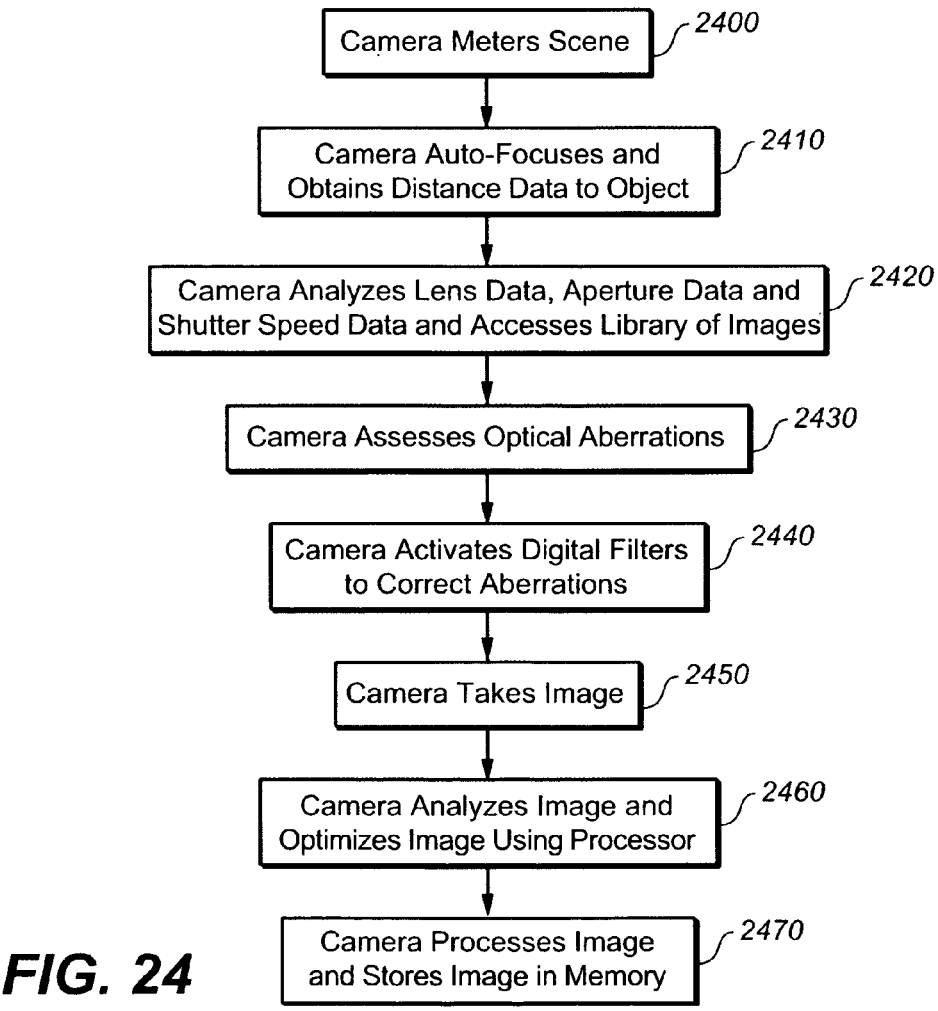
FIG. 24 is a flow chart showing the integration of optical and digital corrections with feedback.

FIG. 24 is a flow chart showing the integration of optical and digital corrections with feedback.

Figure 25:
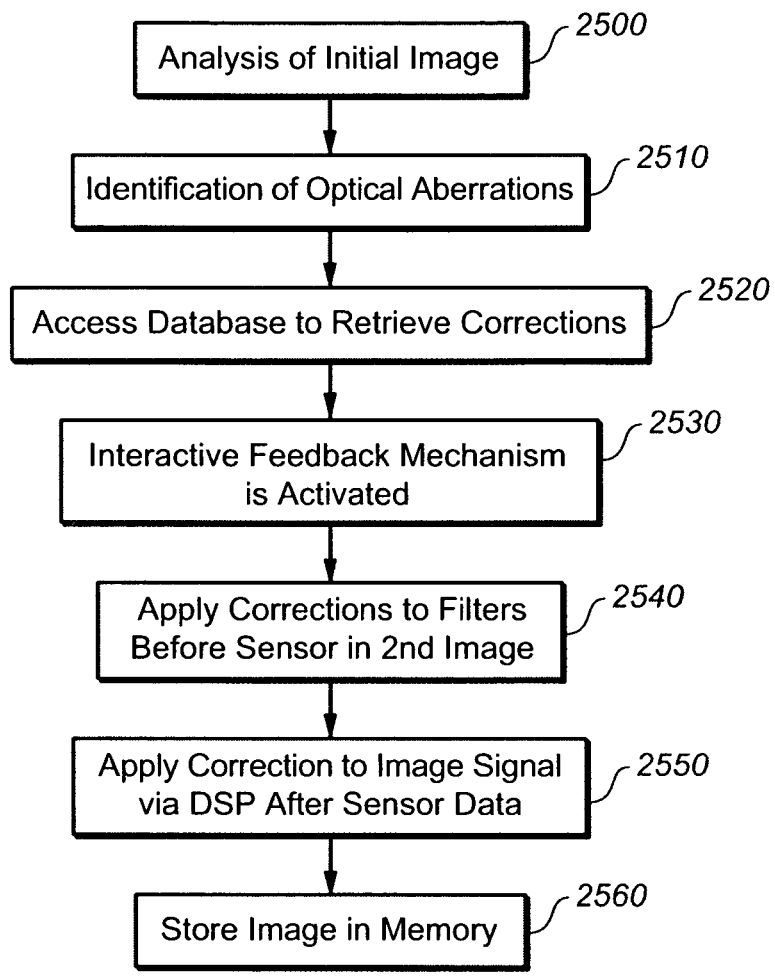
FIG. 25 is a flow chart showing the interactive feedback mechanism of integrated corrections.

FIG. 25 is a flow chart showing the interactive feedback mechanism of integrated corrections.

Figure 26:
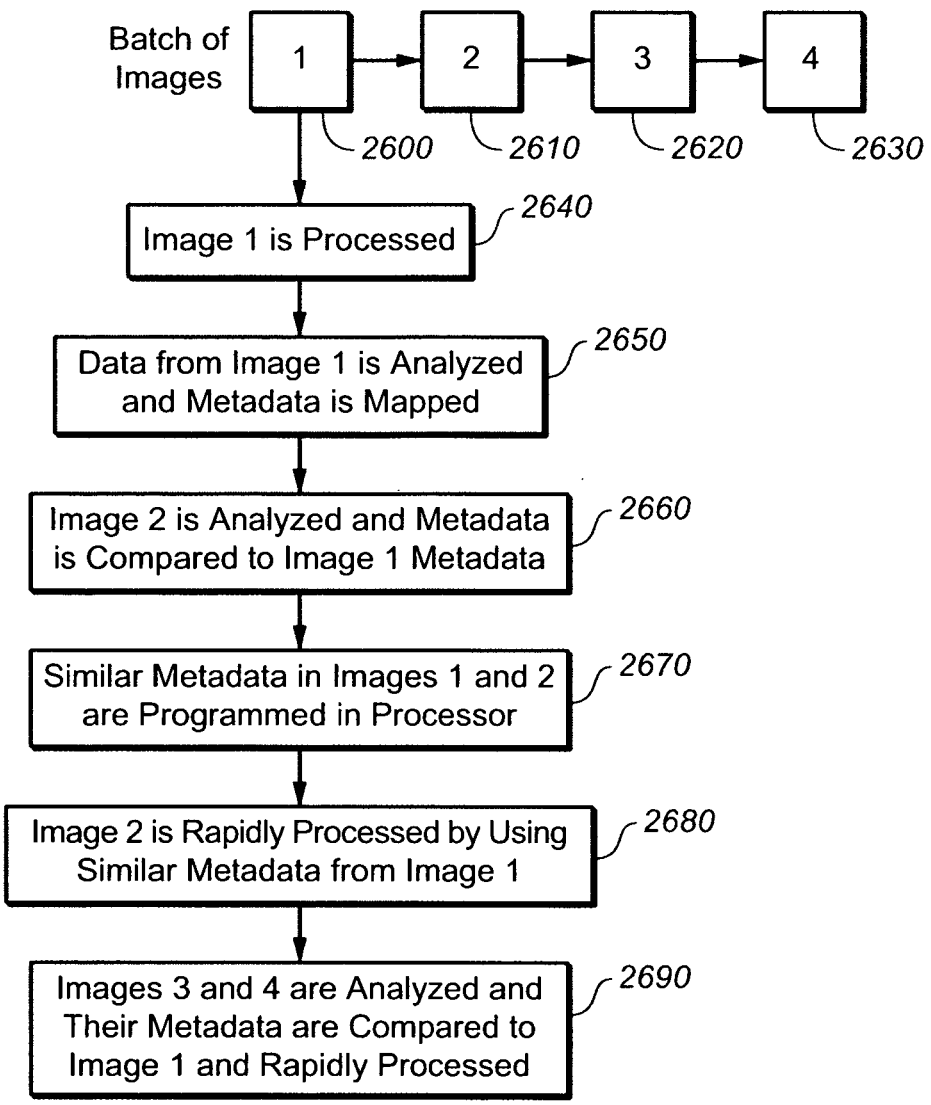
FIG. 26 is a flow chart describing the adaptive user pattern learning process to process images.

FIG. 26 is a flow chart describing the adaptive user pattern learning process to process images.

Figure 27:
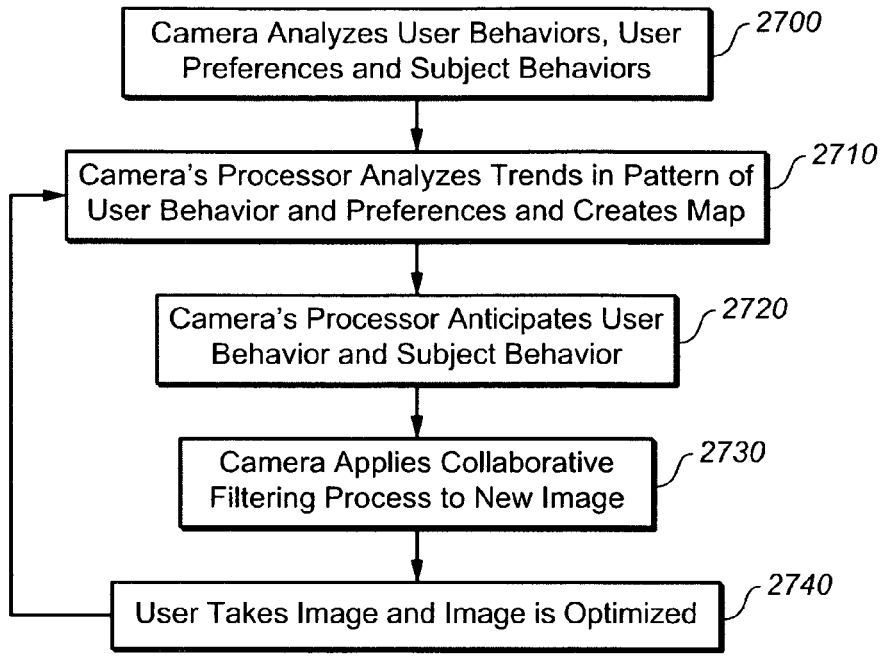
FIG. 27 is a flow chart describing the feedback process in filtering images.

FIG. 27 is a flow chart describing the feedback process in filtering images.

Figure 28:
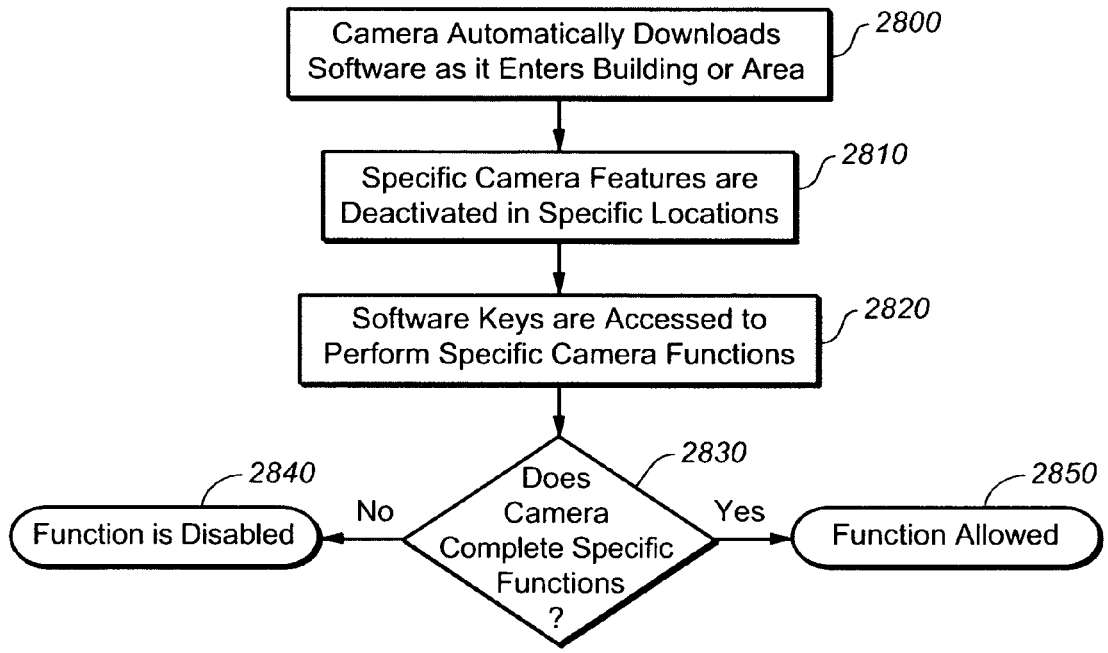
FIG. 28 is a flow chart showing software privacy function in a digital imaging system.

FIG. 28 is a flow chart showing software privacy function in a digital imaging system.

Figure 29:
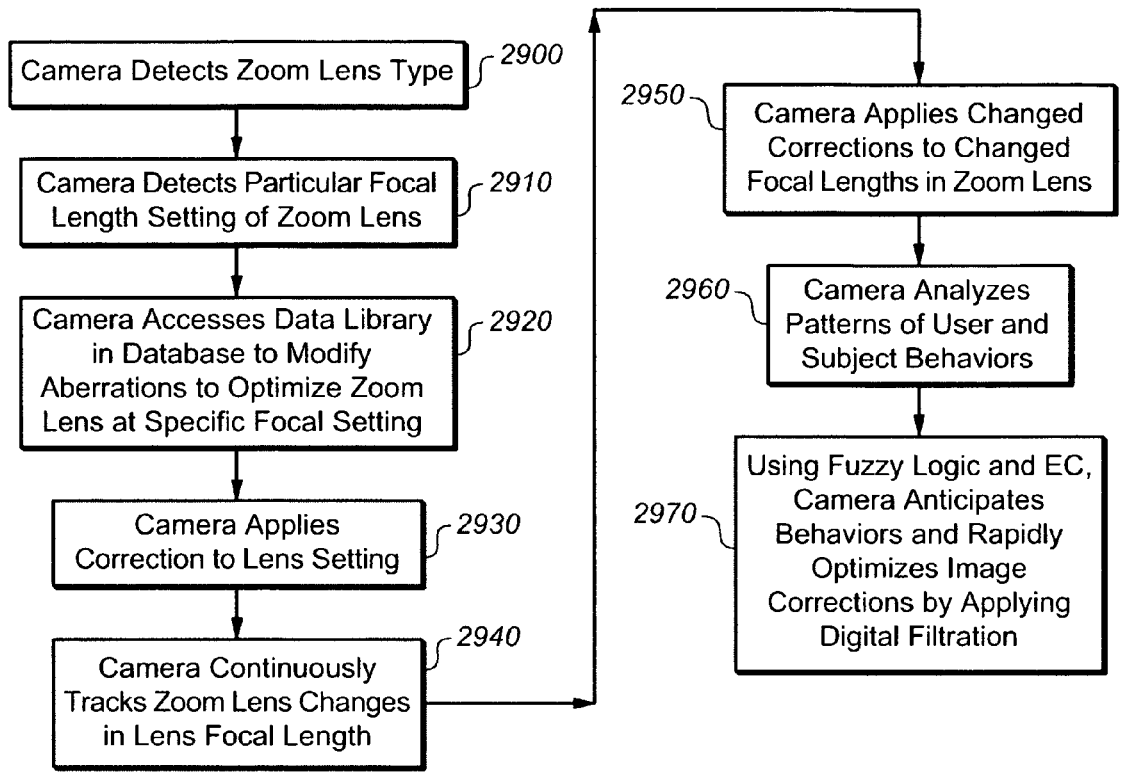
FIG. 29 is a flow chart showing the dynamics of zoom lens corrections in digital imaging.

FIG. 29 is a flow chart showing the dynamics of zoom lens corrections in digital imaging.

Figure 30:
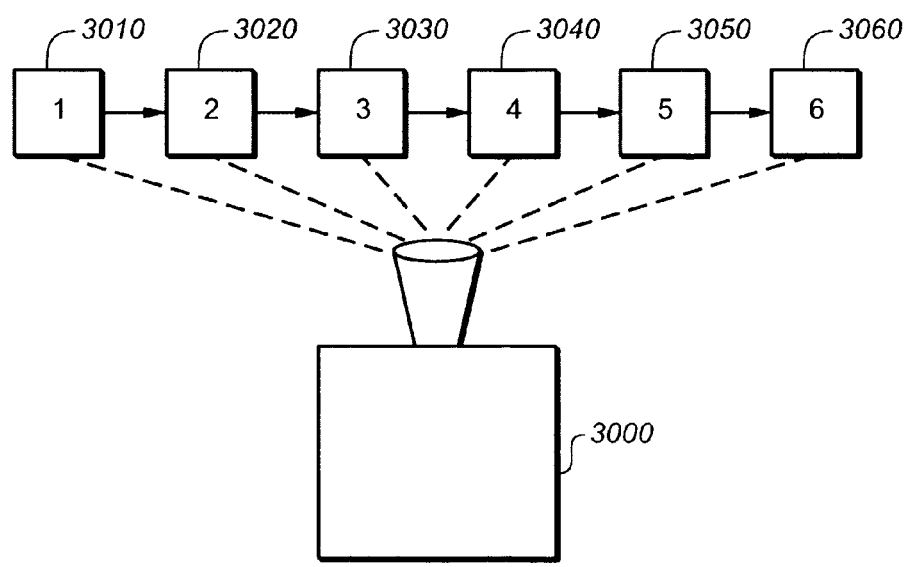
FIG. 30 is a diagram illustrating object tracking in dynamic changes in video corrections.

FIG. 30 is a diagram illustrating object tracking in dynamic changes in video corrections.

Figure 31:
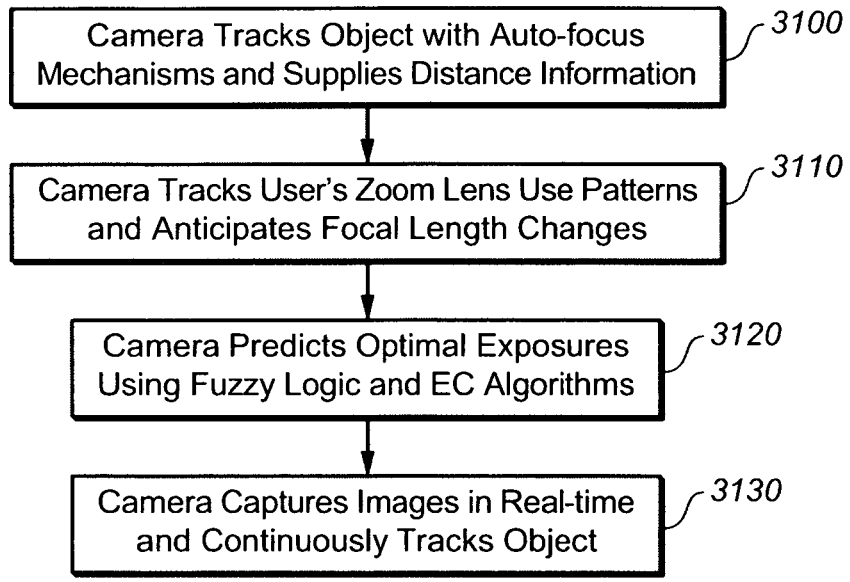
FIG. 31 is a flow chart showing object tracking of a digital imaging system.

FIG. 31 is a flow chart showing objecting tracking of a digital imaging system.

Figure 32:
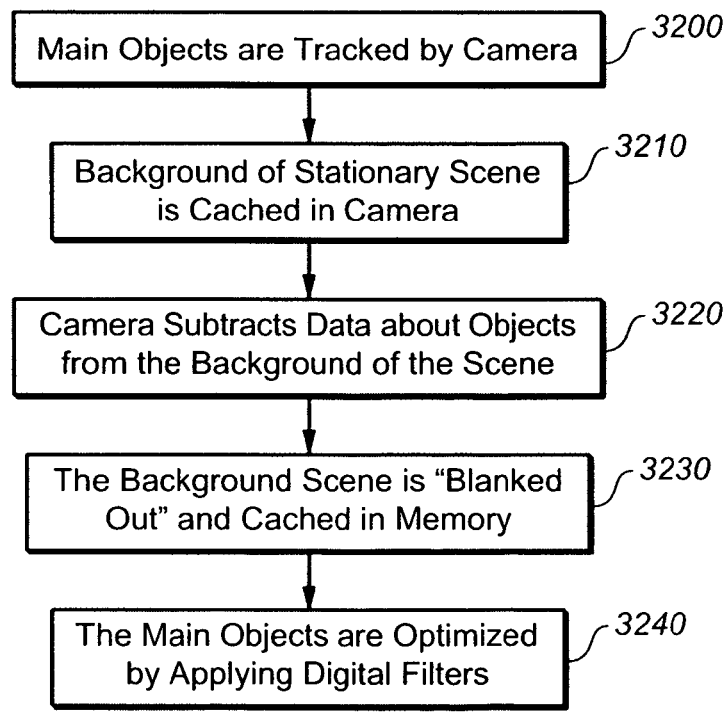
FIG. 32 is a flow chart showing the caching process of an object in motion in a stationary scene.

FIG. 32 is a flow chart showing the caching process of an object in motion in a stationary scene.

Figure 33:
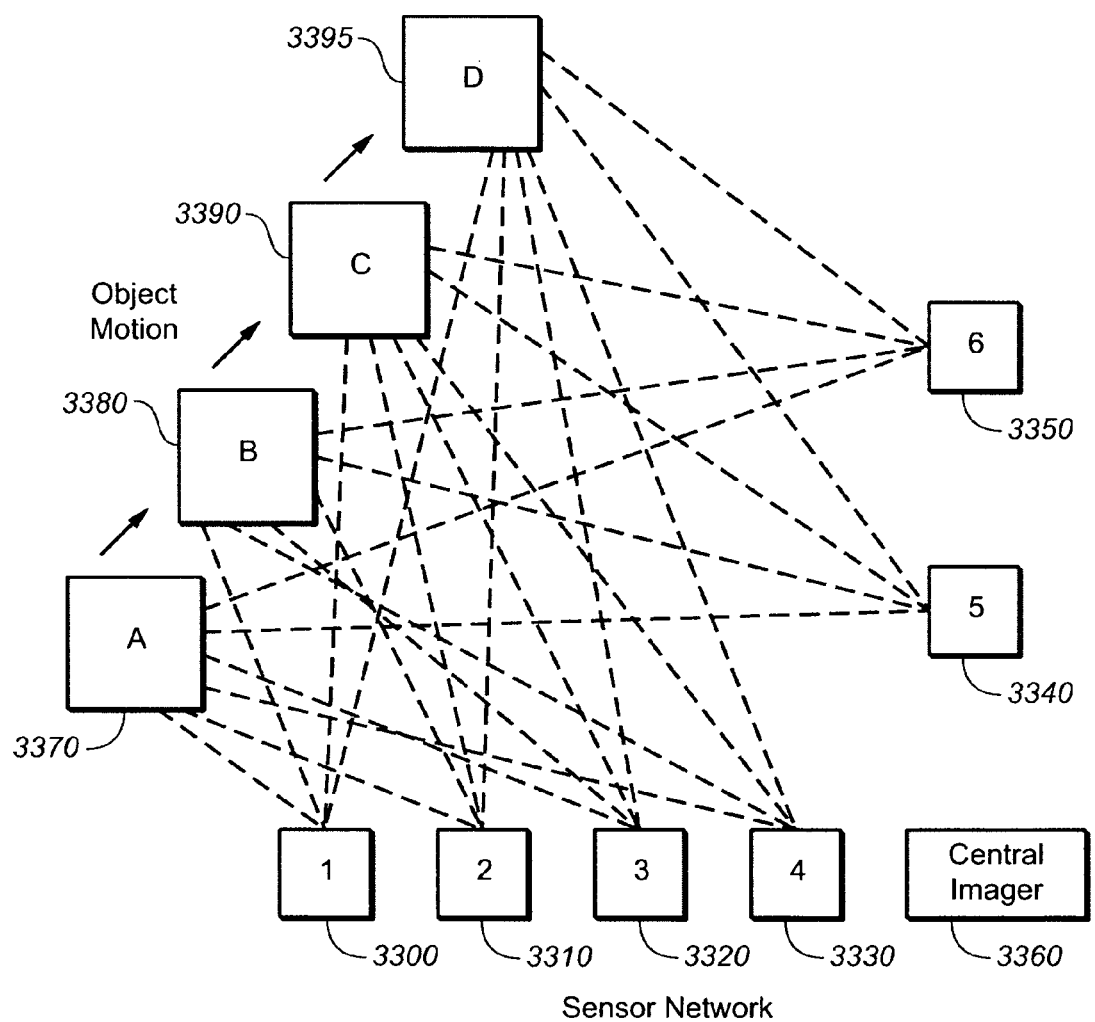
FIG. 33 is a diagram showing network coordination of fixed sensor grid tracking multiple objects.

FIG. 33 is a diagram showing network coordination of fixed sensor grid tracking multiple objects.

Figure 34:
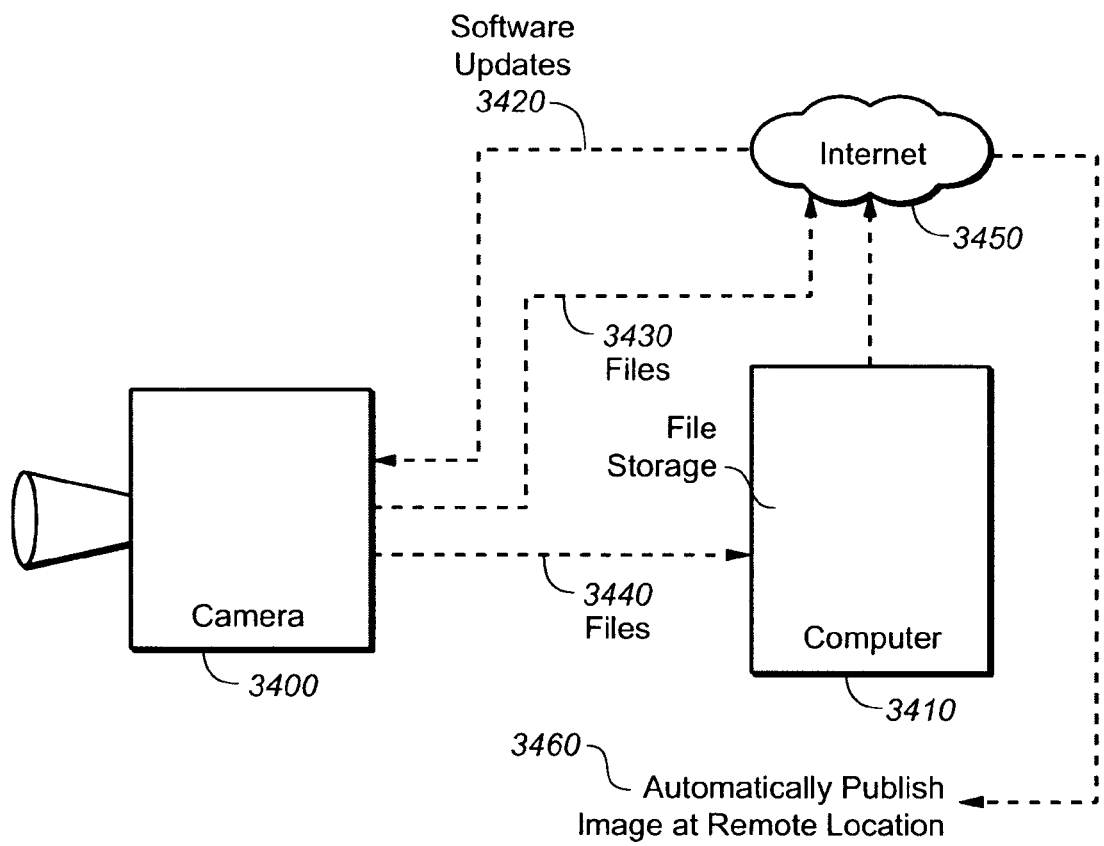
FIG. 34 is a diagram showing the wireless communication features of the digital imaging system.

FIG. 34 is a diagram showing the wireless communication features of the digital imaging system.

Figure 35:
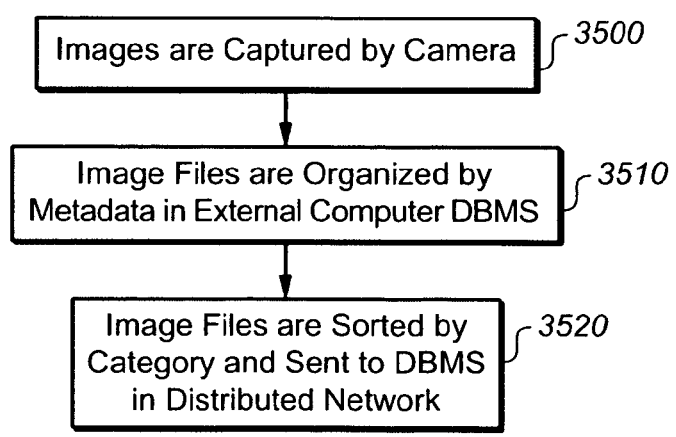
FIG. 35 is a flow chart showing an image organization system.

FIG. 35 is a flow chart showing an image organization system.

DETAILED DESCRIPTION OF THE DRAWINGS

FIG. 1 illustrates the overall structure of the system. Object data (100) in the domain of objects being photographed by the camera constantly change. In some cases, the lighting changes, while in other cases, the positions of the objects change. At 120 the flash will artificially light the objects. Flashes may be either on the camera or remote from the camera. A camera sensor (130) will detect external data changes. An optical lens (110) feeds analogue imaging data to the digital sensor(s) (175 and 180). In some cases, a mirror (170) will swivel in order to directly input imaging data to the digital sensor after the shutter (150) is fired. In some cases, a filter (160) stands between the lens and the digital sensor(s). A digital signal processor (DSP) (195) is connected to at least one sensor (A or B). A database (190) is connected to at least one sensor (A or B) as well. The digital sensors are connected to an ASIC (195) and/or a microprocessor (193) in order to process the image and control the camera. The digital image data is passed from the digital sensor to either the ASIC or microprocessor and then stored in memory (197). The presence or absence of specific elements of this mechanism is not required for the correct functioning of this system. Consequently, a number of the drawings contained herein will focus only on specific sub-assemblies of the overall digital imaging system mechanism.

The present invention is intended to operate with a spectrum of camera types. These camera categories include digital still cameras without a mirror mechanism or without an optical interface. The present system applies to cameras with single lens reflex mechanisms. In addition, the present system applies to video cameras, both with or without mirror mechanisms, including camcorders. Finally, many of the functions disclosed in the present system are integrated into specific imaging sensors. The system applies to image sensors that are integrated with complex system functions, including those described herein, with "system on a chip" (SoC) capabilities in a single microelectronic integrated circuit. The invention also applies to networks of sensors, networks of cameras or integrated networks of both sensors and cameras.

FIG. 2 describes digital image signal processing. After an analog signal (200) is captured, it is converted to a digital signal by an analog-to-digital converter (210). The signal is then forwarded to the digital signal processor (220) and filtered (230). The digital signal is then stored in memory (240).

In FIG. 3, the correction to the optical vignetting problem is shown. In vignetting, the lens (300) makes the edges of the image significantly darker as the light falls off, a phenomenon particularly prominent on wide angle lenses. As represented here, the concentric circles of filtration correction are darker in the middle (310) of the image in order to counteract the vignetting effect. The overall image aperture is reduced from one half to two stops in order to compensate for the maximum light fall off depending on the amount of vignetting effect from each lens type.

FIG. 4 shows a list of several different wide angle lenses in a database. In the 35 mm domain, the 14 mm (400), 20 mm (410), 24 mm (420), 28 mm (430) and 35 mm (440) lenses, each with f/2.8 apertures are listed in the database. Each lens type presents a distinct formulation involving different sets of optical data that require different aberration corrections.

The digital corrective process is described in FIG. 5. After a specific lens type is identified (500) and a database is referenced (510), the lens type is matched with the specific optical aberrations (520). The digital filter then applies a correction to specific optical aberrations (530). As an example, the vignetting effect is corrected by gradually darkening the center of the image in concentric rings (540).

FIG. 6 shows the database configuration of several different types of 24 mm f/2.8 lenses (600 to 630) with different optical configurations. Each lens type has a different set of manifestations of optical aberrations including vignetting (640), spherical aberration (650), pin cushion distortion (660), barrel distortion (670) and comatic aberration (680). For each lens, there will be a unique combination of optical aberrations compared to each lens type from different optical configurations. The database is accessed to provide the multi-objective optimization solution for correcting several different optical aberrations for each specific lens formula.

In FIG. 7, after a camera captures an image (700) and uses a digital sensor to create a digital file (710), the digital file is forwarded to the digital signal processor semiconductor (720). The DSP applies the filtration (730) to correct the optical aberrations from the lenses. The revised digital file is then sent to storage (740).

Digital filtration is performed by employing the DSP hardware as well as specific software in order to attain specific aberration corrections. In an optical filter, which typically sits at the front of a lens and performs a single function of modifying the optical characteristics of the lens, the electronic filter will process the image after it is converted from an analogue representation to a digital signal. Common digital filters include a low pass filter or anti-aliasing filter. In most cases digital imaging filtration is a discrete time application and is processed in a time-signal sequence.

One example of a digital filtration process is a fast Fourier transform (FFT). The digital signal is modified by applying an algorithm to extract the frequency spectrum. The original function is then reconstructed by an inverse transformation of the original signal. The signal can be manipulated to perform various conversions. This process is used to sharpen or soften an image. For instance, by differentiating the frequency spectrum, the high frequency can be emphasized by limiting the low frequency, as in a high pass filter. Digital filtration is typically performed by the DSP after the image is captured and before the image file is stored. However, in the present system, there is some filtration before the digital sensor that captures the image as well as some filtration processing after the sensor sends the file to the DSP.

In order to accelerate the filtration process, the digital file will be broken into parts, with each part processed simultaneously. Filtering a one-dimensional image will treat data from each column of a digital sensor separately. When the data is treated like a two dimensional image, the data file may be treated with different techniques. For instance, different quadrants of the image may be analyzed and filtered separately. In addition, the highlights and the shadows in the varied frequency range may be analyzed and filtered separately as well. Similarly, a two dimensional image file may be analyzed by starting in a corner and working in each contiguous quadrant in a circular (clockwise or counterclockwise) order. Further, the filtration process may begin in the corners and work inwards or begin in the center of the image and work outwards. For instance, in wide angle lens filtration to correct optical aberrations, the outer edges will be the most prominent distortions that will require the most corrections; therefore, the filtration process will work by starting on the corners first.

The present invention also addresses the multi-functional corrections in an image by applying multiple simultaneous techniques. This is done either by performing a sequential filtration process or a simultaneous filtration process. In either case, the image is re-filtered to make more than one pass in order to correct different types of aberrations.

Different types of aberrations require different types of filtration. In the case of pin cushion distortion and barrel distortion, which are inverse appearing aberrations, the filtration process will adjust the edges of affected digital files captured with wide-angle lenses. The optimized images will be accessed by the database and compared to the actual image files. The filtration will be applied to each image file to closely correct the distortions bit by bit. In effect, the corrected digital images will be reverse engineered to discover the unique distortions as they establish a pattern by comparing the input digital images and the database of optimized images. The digital image correction will be applied once the aberration is assessed.

Each lens provides data to the camera microprocessor and DSP about its unique characteristics. The lens is pre-programmed with aberration data pertaining to that lens type and even to each particular lens (ascertained through a testing process). The lens then provides this specific data to the camera for processing of optical aberrations. In one additional embodiment, the lens will also contain software to correct its aberrations that will also be sent to the camera processors in order to be applied to specific digital file filtration. As information and techniques are made available, new software to ascertain and correct each lens's unique optical aberrations will be forwarded to the camera and stored in the lens, thereby providing an upgrade path to continuously improve the optical qualities of lenses by employing a sort of after-manufacture digital correction.

FIG. 8 shows the process of selecting filtration settings. After the user selects the specific filtration settings (800), the user marks the specific filtration setting and accepts the setting (810). The user may continue to select multiple settings. When the user has selected all preferences (820) and accepts the settings the user returns to the main menu.

In FIG. 9 varied depth of field optimization at different apertures is described. In the first drawing, the object (930) has a depth of field (940) that has a broad range of clarity around the object. The camera (900) evaluates the distance data (920) and the object to establish an optimal depth of field range between f/8 and f/11. In the second drawing, the object (980) has a narrower depth of field range (990) based on distance data (970) and object data from the camera (950) to determine an optimal depth of field range between f/2.8 and f/5.6. The camera's automatic alteration of the aperture to narrow the depth of field is based on a range of factors, including the focus on the object, the object's motion, the distance to the camera, shutter speed constraints and the light on the object. Modulating aperture automatically in the camera provides a blurring of the background and the foreground so that the object can stand out without distraction.

Exposure optimization using digital correction is shown in FIG. 10. After the camera assesses an object's distance from the camera (1000) and identifies the optimal aperture of the image to maximize the dynamic range (1010), the aperture is either increased (1020) or decreased (1030) and the correction applied (1040).

In-camera special effects filtration is illustrated in FIG. 11. Once the image exposure is assessed by using the camera exposure meter (1100), the camera corrects the image by either underexposing the image by one third stops to one stop if the image is overexposed (1110) or overexposing the image by one third stops to one stop if the image is underexposed (1120). The camera finally takes a picture and stores the image (1130).

FIG. 12 shows the selective in-camera filtration of specific objects. After the camera identifies specific objects (1200), the camera assesses distance to the objects (1210). This is done by sending out an infrared light signal, bouncing it off the object, and measuring the distance data from the camera to the object. The camera isolates the objects on a one-dimensional Euclidian plane (1220) and then selects the optimum aperture to isolate objects and to blur the background and foreground (1230). The camera tracks the motion of objects (1240) and activates a digital sensor (1250) thereby capturing the image. The image data is sent to a post-sensor processor (1260) where the camera applies specific filtration only to the designated objects (1265) and stores the file in memory (1270). Alternatively, the camera will apply specific filtration only to the background (not to the objects) (1275) and then stores the file in memory (1280). The effect of only applying filtration to an object or to its background is to isolate the subject. The type and degree of special effects, which are selected by user-adjustable in-camera software, will be determined by the user's palate of filtration choices.

Image exposure adjustment using in-camera filtration is described in FIG. 13. Once the camera assesses a two stop difference in parts of the image (1300), the camera's microprocessor accesses the database of similar scenes (1310) and then selects the optimal metering for the image and the user activates the digital sensor (1320), capturing an image. The camera provides the filtration to part of the image by adjusting the exposure in the processor (1330) and then stores the image (1340). In scenes such as sky on top, a neutral density filter is often required to remove the two stop difference between the bright top of the image and the darker bottom of the image. By reducing the brightness at the top, the exposure is evened out. By using the present system, this process is accomplished in the camera.

In-camera special effects filtration is described in FIG. 14. After a user selects a special effects filtration technique (1400), the camera assesses image meta-data (1410), analyzes image data (1420) and the user captures the image (1430). The camera's post-capture processor applies special effects filtration technique to part of the image (1440) and the camera stores the image in memory (1450).

Digital correction for sensor dust is described in FIG. 15. The pattern of dust on the pixels of a digital sensor (1500) is assessed. The specific pixels that are obscured by the dust are identified (1510) and a map is built of a digital sensor pixel frame by comparing information from at least two image samples to identify obscured pixels (1520) and the camera takes an image (1530). Information from pixels that are adjacent to dust-affected pixels are used to interpolate data on affected pixels (1540) and image data is processed and stored in memory (1550).

FIG. 16 shows an ASIC array in a digital imaging system. Once the digital sensor (1620) captures an image, the digital file is sent to multiple application specific integrated circuits (1630, 1640, 1650 and 1660) for processing of several digital signals simultaneously. In one embodiment of the invention, each ASIC corrects a single optical aberration. In another embodiment, the ASICs will divide the digital file and perform specific functions on parts of the image file and reunite the file before storing the completed image in memory (1670).

In FIG. 17, the camera is illustrated with multiple interchangeable digital sensors. The CCD (1720) is shown in the forward position capturing the digital image in this drawing. However, the CMOS (1730) digital imaging sensor may swivel around (1740) to replace the position of the CCD in order to be used to capture the image. The image is then processed (1750) and stored in memory (1760). The advantages of interchanging the digital sensors are to have the opportunity to benefit from the strengths of each sensor type without sacrificing the weaknesses of either. In some cases, the scene will be optimized for the exposure range of a CMOS digital sensor, while at other times, the scene will be optimized for the detail of the CCD.

In FIG. 18, the nano-grid (1820) appears in front of the digital sensor (1830). The lens will send analog image data to the sensor through the nano-grid. Once the digital data from the sensor is processed (1840) it is sent to memory (1850). FIG. 19 shows a nano-grid (1900). Nanofilaments are shown at 1920. The modulation effects of the nanofilaments are shown at 1910. Nanofilaments will change their position in order to allow more or less light through the system. Nano-grids fit before, or in some cases, adjacent to and on top of the digital sensor. Nano-grids behave as adjustable screens and may be used to polarize light between the lens and the digital sensor. Nano-grids are activated by electrical charge pulses sent to nanofilaments.

In FIG. 20, the feedback loop connecting the processor and the nano-grid is shown. Analog optical data passes through the nano-grid (2020) to the digital sensor (2030) to the processor (DSP) (2040). A feedback loop (2050) is created by analyzing the data at the processor and modulating the performance of the nano-grid. For example, the image may be very bright initially, but the DSP will require that the image needs to be darker in order to be properly exposed. In this case, it will activate the nano-grid to modulate its grid structure in order to darken the image so as to let less light through the filaments by adjusting the filament structure. Once properly exposed, the camera will capture a digital image and send the file to memory (2060) for storage.

In FIG. 21, a tri-pixel architecture is described. The large (deeper) oval bucket in the center (2110) will capture highlight exposure, the medium sized oval bucket at the right (2120) will capture a normal exposure range and the small (shallower) oval bucket at the left (2130) will capture the shadow exposure range. These three separate wells are contained within each pixel. In most cases, a pixel well is like a bucket, capturing light data and passing the data sets to the digital processor. By splitting the exposure range into three distinct wells within each pixel, the data is more accurately captured and organized in order to accommodate the broader range of exposure data. This system will be able to increase the range of digital imaging up to four stops, from the typical two stops. By maximizing the range of exposure data, the image collection will display more tonal range that is more associated with films' broader exposure range.

FIG. 22 shows the pre-programmed module for in-camera functionality. After the camera detects the lens type and the sensor type (2200), the camera focuses on an object (2210) and the processor accesses the library of scene and filter types (2220). The user pre-selects specific in-camera modifications (2230) and activates the camera to capture an image (2240). The processor makes filtration adjustments after the sensor takes the image (2250) and the image file is stored (2260) in memory.

Much like the nano-grid that is present before the digital image sensor, the pre-sensor modification to an image is shown in FIG. 23. An optical filter (2320) such as a polarizer filter is shown in a position between the lens and the digital sensor (2340). The image is captured and the optical filter is activated by the processor (2350), which determines whether to activate the filter after analyzing a particular scene. Other filtration (2330), such as the use of the nano-grid, is also interchangeable with the optical filter in a position before the digital sensor. In another embodiment of the present invention, the filter assembly is sequential, with both, or multiple, filters being activated in order so as to obtain the maximum filtration effect. The DSP will compute the optimal combination of filtration resources based on the available resources in the camera. In another embodiment, the optical filter assembly will fit out of the line of sight between the lens and the digital sensor and will be activated by the DSP on-demand to swing into the optical image path much like a mirror mechanism.

FIG. 24 shows the integration of optical and digital corrections with feedback. Once the camera meters a scene (2400), the camera auto-focuses and obtains distance data to the object (2410), analyzes the lens data, the aperture data and the shutter speed data and accesses the library of images (2420). The camera assesses the optical aberrations (2430), activates the digital filters to correct aberrations (2440) and takes the picture (2450). The camera analyzes the image and optimizes the image using the processor (2460). This is performed by comparing the image data to the library of images and assessing the needed filtration required to optimize the image. The image is then stored in memory (2470).

The interactive feedback mechanism of integrated correction is described in FIG. 25. After an analysis of the initial image (2500), the identification of optical aberrations (2510) is made. The camera's database is accessed to retrieve the corrections (2520) and the interactive feedback mechanism is activated (2530). Corrections to filters are applied before the sensor captures the next image (2540). In addition, correction to the image signal via the DSP is made after the sensor data is captured (2550) and the image is stored in memory (2560).

The adaptive user pattern learning process is shown as images are processed in FIG. 26. A batch of images (2600, 2610, 2620 and 2630) is shown. The first image is processed (2640) and data from image 1 is analyzed and metadata is mapped (2650). Image 2 is then analyzed and its metadata is compared to the image 1 metadata (2660). Similar metadata in images 1 and 2 programmed in the processor (2670) and image 2 is rapidly processed by using similar metadata from image 1 (2680). Images 3 and 4 are analyzed and their metadata are compared to image 1 and rapidly processed (2690).

In FIG. 27, the feedback process of filtering images is shown. After the camera analyzes the user behaviors, user preferences and subject behaviors (2700), the camera's processor analyzes trends in the pattern of user behavior and preferences and creates a map (2710). The camera's processor anticipates the user behavior and subject behavior (2720) by applying evolutionary computation and fuzzy logic algorithms. The camera's processor then applies a collaborative filtering process to a new image (2730) and the user takes and optimizes the image (2740).

FIG. 28 shows a software privacy function in a digital imaging system. The camera automatically downloads software as it enters a building or specified area (2800). The camera's features are deactivated in specific locations by the software (2810) while allowing the camera to perform specific camera functions by accessing software keys (2820). The camera then performs specific functions (2830) that are available in the restricted area while other specific functions are disabled (2850).

In FIG. 29, the dynamics of zoom lens corrections are described. After a lens detects a zoom lens type (2900), the camera detects a particular focal length setting of the zoom lens (2910) and accesses a data library in the database to modify aberrations to optimize the zoom lens at a specific focal setting (2920). The camera applies a correction to a lens setting (2930) and continuously tracks the lens changes in the lens focal length (2940). The camera then applies the changed corrections to the changed focal lengths in the zoom lens (2950) and analyzes patterns of the user and subject behaviors (2960). Using fuzzy logic and evolutionary computation, the camera anticipates behaviors and rapidly optimizes image corrections by applying digital filtration (2970).

FIG. 30 shows object tracking in the dynamic changes of video corrections. An object moves from position 1 (3010) to position 6 (3060) in sequence. The camera (3000) is stationary, yet it records the object's motion as it is moving within the field of vision.

In FIG. 31, object tracking is described. Once the camera tracks an object with auto-focus mechanisms and supplies distance information (3100), it tracks the user's zoom lens use patterns, anticipates the focal length changes (3110) and, using evolutionary computation and fuzzy logic algorithms, predicts optimal exposures (3120) and captures images in real time, continuously tracking the object (3130).

FIG. 32 shows the caching process of a moving object in a stationary scene. After the main objects are tracked by the camera (3200), the background of a stationary scene is cached in the camera (3210). The camera subtracts the data about objects from the background of the scene (3220). The background scene is then "blanked out" and cached in memory (3230) and the main objects are optimized by applying digital filters.

FIG. 33 describes the network coordination of a fixed sensor grid tracking multiple objects. The object in motion is represented in positions A through D (3370, 3380, 3390 and 3395). The fixed sensors are at positions 1-6 (3300, 3310, 3320, 3330, 3340 and 3350). The image data is fed remotely into the central imager (3360). The sensors track the object by taking image data at each fixed sensor position in the network. As the object moves through the field of the network, each sensor records the object.

In FIG. 34, wireless communication features of the digital imaging system are described. The camera (3400) sends digital image data files wirelessly to a computer (3410). Files are also uploaded from the camera to the Internet in accessible locations (3450), while software files are downloaded from the Internet to the camera, both automatically and through manual intervention. Files are automatically downloaded if the user sets the camera to receive automated software updates. One advantage of loading files automatically to the Internet is that the images are then automatically published (3460) at a remote location, or locations, for viewing.

FIG. 35 describes an image organization system. After images are captured by the camera (3500), the image files are organized according to metadata in an external computer database (3510). The image files are then sorted by category and sent to the database of a distributed network (3520) for off-site storage.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

I claim:

1. A digital imaging system for correcting optical image aberrations comprising:
    a digital camera mechanism, an optical lens mechanism, a digital sensor, a microprocessor, a digital signal processor, system software, a database management system and a memory storage sub-system;
    wherein the optical lens mechanism is a fixed focal length lens;
    wherein a microprocessor uses system software to identify at least one optical aberration by accessing the database;
    wherein the microprocessor uses the database to identify at least one algorithm to use to correct the at least one optical aberration;
    wherein when the image file is captured by the digital sensor the digital file is forwarded to the digital signal processor;
    wherein the image file with the at least one optical aberration is corrected by applying digital filtration by using at least one algorithm in the digital signal processor; and
    wherein the modified digital file consisting of the digital data optimized from the at least one optical aberration that are corrected from the original optical image is stored in memory.

2. The system of claim 1:
    wherein the optical aberrations include at least one of spherical, comatic, lens distortion, astigmatism, curvature of field, pin cushion, barrel distortion, chromatic aberrations, scattered light, red eye, dust and/or flare types of optical aberrations.

3. The system of claim 1:
    wherein the optical aberration is vignetting;
    wherein the digital signal processor applies neutral density filtration from one third of a stop to three stops in the center of the image and/or wherein the digital signal processor applies an algorithm to lighten the corners of the image or the digital signal processor applies both neutral density filtration in the image center and/or an algorithm to lighten the corners of the image; and
    wherein the image exposure is optimized to correct the vignetting.

4. The system of claim 1:
    wherein the digital signal processor applies at least one fast Fourier transform (FFT) algorithm to correct the at least one optical aberration.

5. The system of claim 1:
    wherein each lens type is registered in the camera database;
    wherein the multiple optical aberrations of each lens is listed in the database;
    wherein the filtration solutions to the lens optical aberrations are listed in the database;
    wherein the filtration of each lens optical aberration is applied by the digital signal processor; and
    wherein after the digital signal processor applies the filtration to correct the optical aberrations the corrected digital file is forwarded to storage in memory.

6. A digital imaging system for correcting image aberrations comprising:
    a digital camera mechanism, an optical lens mechanism, a digital sensor, an integrated circuit, a digital signal processor, system software, a database management system and a memory storage sub-system;
    wherein the optical lens mechanism is a zoom lens or a fixed focal length lens;
    wherein the image data file is forwarded from the digital sensor to storage in memory;
    wherein at least one optical and/or digital aberration in the image file are identified by comparing image files in the database management system by using the system software and the integrated circuit;
    wherein the at least one filtration algorithms required to correct the at least one optical and/or digital aberration are sent from the integrated circuit to the digital signal processor;
    wherein the at least one optical and/or digital aberration from the optical lens mechanism are corrected by using the digital signal processor to apply digital filtration algorithm; and
    wherein the modified digital file consisting of the digital data optimized from the at least one aberration that are corrected from the original optical image is stored in memory.

7. The system of claim 6:
    wherein the optical aberrations include spherical, comatic, lens distortion, astigmatism, chromatic aberrations, curvature of field, pin cushion, barrel distortion, scattered light, red eye, dust and/or flare types of optical aberrations.

8. The system of claim 6:
    wherein the digital aberrations include moiré and/or aliasing.

9. The system of claim 6:
    wherein the digital signal processor applies a fast Fourier transform (FFT) algorithm to correct optical and/or digital aberrations.

10. The system of claim 6:
wherein the digital signal processor applies color filtration to the image file.

11. The system of claim 6:
wherein the digital image file are filtered to correct at least one optical and/or digital aberrations after initial capture and before the image file is initially sent to storage.

12. The system of claim 6:
wherein the integrated circuit may be a microprocessor, an application specific integrated circuit or a system on a chip.

13. The system of claim 6:
wherein the optical aberration is vignetting;
wherein the digital signal processor applies neutral density filtration from one third of a stop to three stops in the center of the image and/or wherein the digital signal processor applies an algorithm to lighten the corners of the image or the digital signal processor applies both neutral density filtration in the image center and/or an algorithm to lighten the corners of the image; and
wherein the image exposure is optimized to correct the vignetting.

14. A digital imaging system for correcting image aberrations comprising:
a digital camera mechanism, an optical lens mechanism, a digital sensor, a microprocessor, a digital signal processor, system software, a database management system and a memory storage sub-system;
wherein the optical lens mechanism is a zoom lens;
wherein the zoom lens changes focal length positions;
wherein when the image file is captured by the digital sensor the file is forwarded to the digital signal processor and to memory;
wherein the microprocessor uses system software to access the database to identify at least one optical aberration in the image file at any focal length of a zoom lens configuration;
wherein the microprocessor accesses the database to obtain at least one filtration correction algorithm to the optical aberrations and forwards the at least one filtration algorithms to the digital signal processor;
wherein the image file is forwarded to the digital signal processor which applies at least one filtration algorithm to optimize the image and corrects the at least one optical aberration at the specific focal length in the zoom lens configuration; and
wherein the modified image file consisting of the digital data optimized from the at least one optical aberration of a specific focal length of the zoom lens that are corrected from the original optical image is stored in memory.

15. The system of claim 14:
wherein the optical aberrations include vignetting, spherical, comatic, lens distortion, chromatic aberrations, curvature of field, pin cushion, barrel distortion, scattered light, red eye, dust and/or flare types of optical aberrations.

16. The system of claim 14:
wherein the digital signal processor applies a fast Fourier transform (FFT) algorithm to correct optical and/or digital aberrations.

17. The system of claim 14:
wherein each focal length of a zoom lens is analyzed for a different set of optical aberrations.

18. The system of claim 14:
wherein the optical aberration is vignetting;
wherein the digital signal processor applies neutral density filtration from one third of a stop to three stops in the center of the image and/or wherein the digital signal processor applies an algorithm to lighten the corners of the image or the digital signal processor applies both neutral density filtration in the image center and/or an algorithm to lighten the corners of the image; and
wherein the image exposure is optimized to correct the vignetting.

* * * * *